United States Patent
Barnett et al.

(10) Patent No.: US 11,417,364 B2
(45) Date of Patent: Aug. 16, 2022

(54) SYSTEM AND METHOD FOR PERFORMING A REWIND OPERATION WITH A MOBILE IMAGE CAPTURE DEVICE

(71) Applicant: Google LLC, Mountain View, CA (US)

(72) Inventors: Donald A. Barnett, Monroe, WA (US); David Karam, Los Gatos, CA (US); Anton Vayvod, New York, NY (US); Aaron Michael Donsbach, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/053,191

(22) PCT Filed: Oct. 9, 2018

(86) PCT No.: PCT/US2018/054913
§ 371 (c)(1),
(2) Date: Nov. 5, 2020

(87) PCT Pub. No.: WO2020/076292
PCT Pub. Date: Apr. 16, 2020

(65) Prior Publication Data
US 2021/0142826 A1    May 13, 2021

(51) Int. Cl.
*H04N 5/93* (2006.01)
*G11B 27/00* (2006.01)
(Continued)

(52) U.S. Cl.
CPC ...... *G11B 27/005* (2013.01); *G11B 20/10527* (2013.01); *H04N 5/23245* (2013.01);
(Continued)

(58) Field of Classification Search
CPC ............ G11B 20/10527; G11B 27/005; H04N 5/23216; H04N 5/23245; H04N 5/23293; H04N 5/232933
(Continued)

(56) References Cited

U.S. PATENT DOCUMENTS 9,143,693 B1    9/2015 Zhou et al.
9,167,213 B2    10/2015 Bratton et al.
(Continued)

FOREIGN PATENT DOCUMENTS

CN    1551631    12/2004
CN    107357936    11/2017
(Continued)

OTHER PUBLICATIONS

International Preliminary Report on Patentability for Application No. PCT/US2018/054913, dated Apr. 22, 2021, 11 pages.
(Continued)

*Primary Examiner* — Robert Chevalier
(74) *Attorney, Agent, or Firm* — Dority & Manning, P.A.

(57) ABSTRACT

A mobile image capture device is provided that can include an image capture system operable to capture image frames and be configured to: provide a live video stream for display in a viewfinder portion of a user interface that depicts at least a portion of a current field of view of the image capture system; store a video segment from the live video stream in a temporary image buffer that includes a plurality of image frames captured by the image capture system; receive a user input that is directed to the viewfinder portion of the user interface that requests a rewind operation; and, in response to such user input, perform the rewind operation in the viewfinder portion of the user interface with respect to the video segment in which at least two of the image frames of
(Continued)

the video segment can be provided for display in the user interface in a reverse chronological order.

17 Claims, 10 Drawing Sheets

(51) Int. Cl.
*H04N 5/232* (2006.01)
*G11B 20/10* (2006.01)
*H04N 5/783* (2006.01)

(52) U.S. Cl.
CPC ............. *H04N 5/232933* (2018.08); *G11B 2020/10537* (2013.01); *G11B 2020/10638* (2013.01)

(58) Field of Classification Search
USPC ........ 386/225, 219, 223, 278, 343, 347, 350
See application file for complete search history.

(56) References Cited

U.S. PATENT DOCUMENTS

| | | | |
|---|---|---|---|
| 2004/0128317 A1* | 7/2004 | Sull ...................... | G06F 16/743 |
| 2012/0301032 A1 | 11/2012 | Kawanishi et al. | |
| 2013/0076908 A1 | 3/2013 | Bratton et al. | |
| 2013/0314442 A1* | 11/2013 | Langlotz ............... | G06T 19/006 |
| | | | 348/222.1 |
| 2014/0236786 A1* | 8/2014 | Nerayoff ................. | G06K 9/18 |
| | | | 705/34 |
| 2014/0358962 A1* | 12/2014 | Wantland .......... | G06F 16/90335 |
| | | | 707/769 |
| 2017/0201672 A1 | 7/2017 | Hayashi et al. | |
| 2017/0244879 A1 | 8/2017 | Bezjian | |
| 2018/0091728 A1* | 3/2018 | Brown .................. | G11B 27/34 |
| 2019/0130943 A1* | 5/2019 | Kauffmann ......... | G06F 3/04883 |

FOREIGN PATENT DOCUMENTS

| | | |
|---|---|---|
| CN | 108259934 | 7/2018 |
| JP | H05328279 | 12/1993 |
| JP | 2006140892 | 6/2006 |
| JP | 2012073421 | 4/2012 |
| JP | 2013138492 | 7/2013 |
| JP | 2016038976 | 3/2016 |
| JP | 2017147656 | 8/2017 |
| JP | 2018156158 | 10/2018 |

OTHER PUBLICATIONS

International Search Report for PCT/US2018/054913, dated Aug. 23, 2019, 3 pages.

* cited by examiner

SYSTEM AND METHOD FOR PERFORMING A REWIND OPERATION WITH A MOBILE IMAGE CAPTURE DEVICE

PRIORITY CLAIM

The present application is national stage filing under 35 U.S.C. § 371 of Patent Cooperation Treaty Application Number PCT/US2018/054913 having a filing date of Oct. 9, 2018. Applicant claims priority to and the benefit of each of such application and incorporates all such application herein by reference in their entirety.

FIELD

The present disclosure relates generally to mobile image capture systems and method. More particularly, the present disclosure relates to a system and method for performing a rewind operation with a mobile image capture device.

BACKGROUND

More and more individuals are using computing devices to capture, store, share, and interact with visual content such as photographs and videos. In particular, for some individuals, handheld computing devices, such as a smartphones or tablets, are the primary devices used to capture visual content, such as photographs and videos.

When capturing photographs or videos of dynamic subject matter via a handheld computing device, however, the user can often miss the moment she intended to capture. For example, the user can open a camera application, point the handheld computing device at the subject matter that she intends to capture, and then operate a shutter button (e.g., a virtual shutter button within a user interface) to instruct the handheld computing device to capture an image. Because of the dynamic nature of the subject matter, however, she can easily press the shutter button too late or too early. As a result, the captured photograph or video may not include what the user intended to capture. This problem is particularly acute when attempting to capture imagery of a specific event and/or imagery that depicts a non-compliant subject (e.g., a child or pet). As a result, even when the user has the camera application open and pointed at the desired subject, the user can fail to capture the photograph at exactly the right time to capture the desired image. For example, the user may fail to capture the image at exactly the fleeting moment when her infant organically laughs with eyes directed toward the camera.

One commonly performed action to address this problem in existing systems is for the user to simply capture a very large number of images around the time when the desired event is expected to occur. However, this attempted solution has a number of problems. First, even though the user has captured a large number of images, there is still no guarantee that the user actually captures the desired moment. Second, this attempted solution results in storage of a large number of photographs on the user's device. This results in a poor allocation of memory resources (e.g., storage of blurry or unwanted photographs) or requires the user to manually go through her photograph collection and delete those images which are unwanted or otherwise do not depict the desired subject matter.

SUMMARY

Aspects and advantages of embodiments of the present disclosure will be set forth in part in the following description, or can be learned from the description, or can be learned through practice of the embodiments.

One example aspect of the present disclosure is directed to a mobile image capture device. The mobile image capture device can include an image capture system operable to capture image frames. The mobile image capture device can include one or more processors and one or more non-transitory computer-readable media that store instructions that, when executed by the one or more processors, cause the one or more processors to perform operations. The operations can include providing a live video stream for display in a viewfinder portion of a user interface. The live video stream can depict at least a portion of a current field of view of the image capture system of the mobile image capture device. The operations can include storing a video segment from the live video stream in a temporary image buffer. The video segment can include a plurality of image frames captured by the image capture system. The operations can include receiving a user input that is directed to the viewfinder portion of the user interface and that requests a rewind operation. The operations can include performing the rewind operation in the viewfinder portion of the user interface with respect to the video segment in response to receipt of the user input that requests the rewind operation. During the rewind operation at least two of the image frames of the video segment can be provided for display in the user interface in a reverse chronological order.

Another example aspect of the present disclosure is directed to a mobile image capture device. The mobile image capture device can include an image capture system operable to capture image frames from a plurality of sources. Each source can have a respective field of view. The mobile image capture device can include one or more processors and one or more non-transitory computer-readable media that store instructions that, when executed by the one or more processors, cause the one or more processors to perform operations. The operations can include providing a live video stream for display in a viewfinder portion of a user interface. The live video stream can include a composite environmental stream generated from the plurality of source. The operations can include storing a video segment from the live video stream in a temporary image buffer. The video segment can include a plurality of image frames captured by the image capture system. The operations can include receiving a user input that is directed to the viewfinder portion of the user interface and that requests a rewind operation. The operations can include performing a rewind operation in the viewfinder portion of the user interface with respect to the video segment in response to receipt of the user input that requests the rewind operation. During the rewind operation at least two of the image frames of the video segment can be provided for display in a user interface in a reverse chronological order.

Another example aspect of the present disclosure is directed to a method for performing a rewind operation. The method can include providing, by one or more computing devices, a live video stream for display in a viewfinder portion of a user interface. The live video stream can depict at least a portion of a current field of view of the image capture system of the mobile image capture device. The method can include storing, by the one or more computing devices, a video segment from the live video stream in a temporary image buffer. The video segment can include a plurality of image frames captured by the image capture system. The method can include receiving, by the one or more computing devices, a user input that is directed to the viewfinder portion of the user interface and that requests a rewind operation. The method can include performing, by the one or more computing devices, the rewind operation in the viewfinder portion of the user interface with respect to the video segment in response to receipt of the user input that requests the rewind operation. During the rewind operation, at least two of the image frames of the video segment can be provided for display in the user interface in a reverse chronological order.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
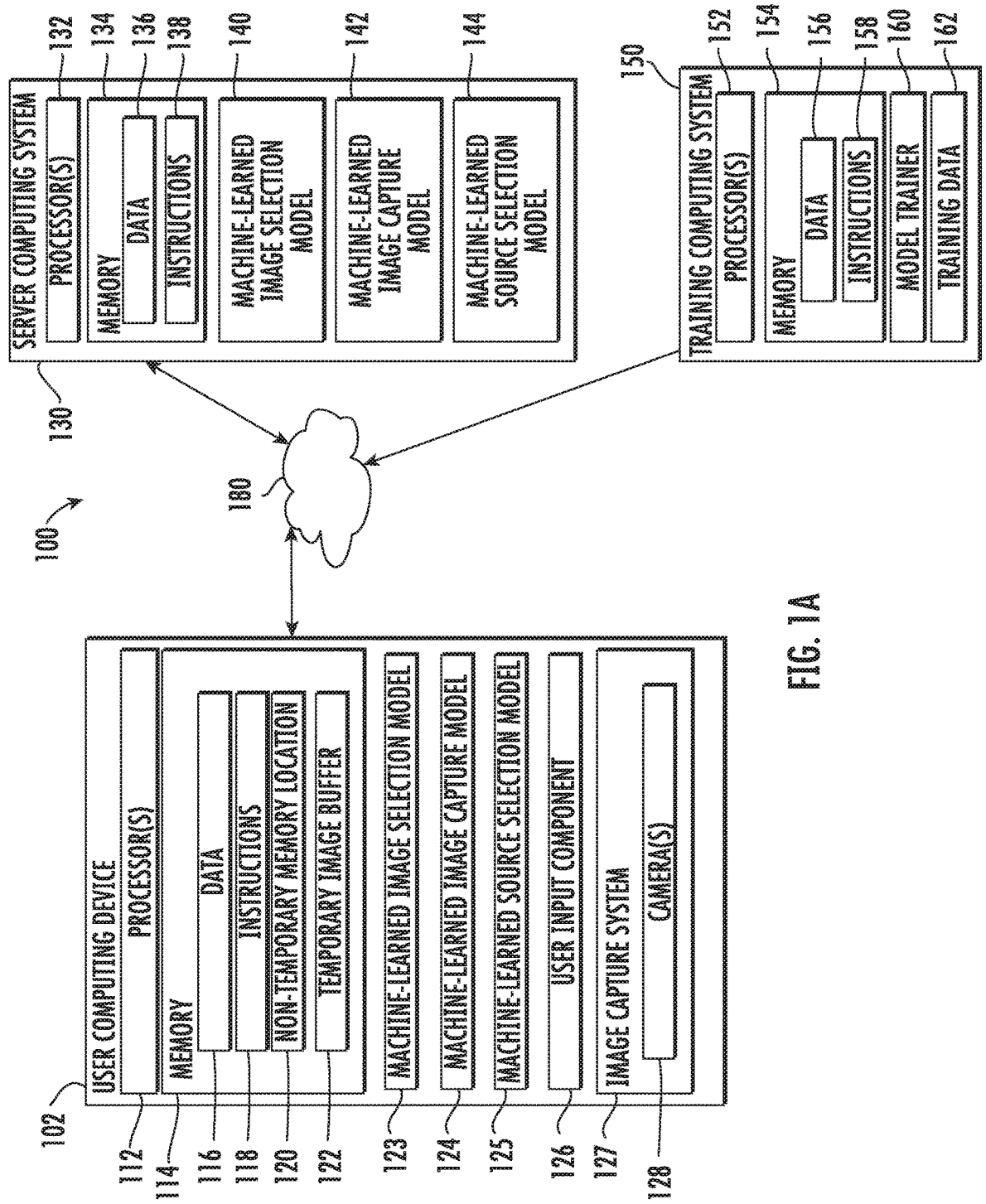
FIG. 1A depicts a block diagram of an example computing system according to example embodiments of the present disclosure.

Reference numerals that are repeated across plural figures are intended to identify the same features in various implementations.

DETAILED DESCRIPTION

Overview

Generally, the present disclosure is directed to systems and methods that provide an improved user experience for capturing images and/or video with a handheld computing device, such as a smartphone or tablet. The systems and methods described herein can provide the user with the ability to "rewind" time and capture video or images from previous moments for which the user failed to explicitly operate the device to capture. This capability can allow the user to capture the "perfect shot," even after the moment has passed.

In particular, in one example, a user can point a camera of a handheld device at a subject of interest and can view a live stream from the camera in a viewfinder portion of a display of the device. The device can temporarily store a video segment from the live video stream (e.g., a set of captured images) in a temporary image buffer. Instead of attempting to press a capture button at the precise moment that the user wishes to capture, she can watch until that moment has passed. Then, the user can request a rewind operation by providing a user input (e.g., a swipe or other motion or gesture). In response, the device can instantly (or quickly) provide the user with the ability to "rewind time" to review prior moments that were displayed on the viewfinder. The prior moments can be displayed in a reverse chronological order and/or the user can control the playback by, for example, scrolling through the video segment in a scrubbing operation. She can select one or more of the images, for example as a photograph or a video that captures the "perfect shot" that she missed, and the selected image(s) can be saved to a non-temporary memory of the device. In such fashion, the proposed system enables the user to capture the "perfect shot" even after the moment has passed but does not flood the user's camera roll with unwanted images or require the user to manually inspect and delete a large number of unwanted photographs.

More particularly, according to one aspect of the present disclosure, a mobile image capture device (e.g., a smartphone or a tablet) can include an image capture system operable to capture image frames. The mobile image capture device can be configured to perform operations. The operations can include providing a live video stream for display in a viewfinder portion of a user interface. The live video stream can depict at least a portion of a current field of view of the image capture system of the mobile image capture device. As an example, the mobile image capture device can include a camera (e.g., a forward-facing and/or rearward-facing camera(s)). The mobile image capture device can be configured to provide a live stream of images captured by one or more of the camera(s) on the viewfinder portion of the user interface. The mobile image capture device can include a touch-sensitive display screen that displays the user interface.

The mobile image capture device can be configured to store a video segment from the live video stream in a temporary image buffer. The video segment can include a plurality of image frames captured by the image capture system. As an example, the video segment can include a moving time window, for example, of a previous time period before the present time. A user input can be received that is directed to the viewfinder portion of the user interface and that requests a rewind operation. The user input can include a user touch action with respect to the touch-sensitive display screen. As an example, the user can swipe, tap, or otherwise touch the touch-sensitive display screen. In response to receipt of the user input, the mobile image capture device can perform the rewind operation in the viewfinder portion of the user interface with respect to the video segment.

During the rewind operation, at least two of the image frames of the video segment can be provided for display in the user interface in a reverse chronological order. As an example, at least a portion of the video segment can be played backwards at a time rate corresponding to a normal forward playback speed. As another example, the images of the video segment can be displayed in a manner that is responsive to continued user input (e.g., via the touchscreen), for example in a scrubbing operation.

In some implementations, the mobile image capture device can be configured to receive a user selection of one of the image frames and store the selected image frame(s) into a non-temporary memory location. In other words, the user can navigate the image frames of the video segment and select which image frame(s) to store (e.g., as a photograph or video) for later viewing. During the rewind operation, the user can selectively view image frames of the video segment. When the user sees a frame that she would like to save as a photograph, the user can provide a user input that requests that the photograph be stored in non-temporary memory. An example of such a user input includes tapping a virtual capture button displayed in the user interface.

In some implementations, the mobile image capture device can allow the user to edit one or more image frames during the rewind operation (e.g., prior to storage in the non-temporary memory location). The user can perform a user input that requests a cropping or zooming function with respect to the currently displayed image frame. As an example, the user can perform a two-finger (e.g., pinching motion) user input to control the cropping/zooming function.

As another example, the user can rotate the mobile image capture device from a first orientation (e.g., a portrait orientation) that is associated with a first image aspect ratio (e.g., a portrait aspect ratio) to a second orientation (e.g., a landscape orientation) that is associated with a second image aspect ratio (e.g., a landscape aspect ratio). In response, the mobile image capture device can change from displaying the currently displayed image frame in the first image aspect ratio to the second image aspect ratio. In some implementations, the mobile image capture device can capture image frames having a wide field of view (e.g., using a wide angle camera). The field of view of the image frames can be larger than first image aspect ratio and/or second image aspect ratio (e.g., wider than the landscape aspect ratio and/or taller than the portrait aspect ratio). When displaying the image frame(s) in the portrait orientation, the mobile image capture device can display a portion of the image frame(s) (e.g., a portrait cropped version) having the portrait aspect ratio. Similarly, when displaying the image frame(s) in the landscape orientation, the mobile image capture device can display a portion of the image frame(s) (e.g., a landscape cropped version) having the landscape aspect ratio. Once the user has finished editing the image frame(s), the image frames may be stored in the non-temporary memory location. Thus, the user may quickly crop the image frame(s) prior to storage for later viewing by simply rotating the mobile image capture device during the rewind operation.

As yet another example, the user can perform a user input that requests an adjustment to one or more characteristics of the image frame(s) (e.g., brightness, contrast, color saturation, etc.) prior to storing the image frame(s) in the non-temporary memory location. The mobile image capture device may be configured to allow the user to perform a variety of suitable image or video editing functions to one or more image frame(s) of the video segment prior to storage in the non-temporary memory location.

In some implementations, the user can initiate the rewind operation, store one or more image frames, and end the rewind operation with a single gesture. As an example, the user can initiate a swipe gesture with her finger on the touchscreen to request the rewind operation. The user can maintain contact between her finger and the touchscreen (e.g., while performing a scrubbing operation) until an image frame is displayed that she would like to save as a photograph. She can then lift her finger from the touchscreen to request that the currently displayed image frame be saved into the non-temporary memory location as a photograph. Lifting her finger from the touchscreen can also optionally end the rewind operation. In response, the mobile image capture device can resume displaying the live video stream in the viewfinder portion of the user interface.

The user can similarly save a portion of the video segment in non-temporary memory during the rewind operation for later viewing. For example, during the rewind operation the user can mark a beginning and an end of a portion that she wishes to save. The user can mark the beginning and ending using a variety of user input actions, including, for example, pressing a virtual marker button, momentarily lifting her finger from the touchscreen, or any other suitable gesture or input.

In some implementations, as indicated above, the mobile image capture device can be configured to perform a scrubbing operation in response to movement of the user input, for example during the rewind operation. The scrubbing operation can be configured to allow the user to navigate between various image frames of the video segment (e.g., in a reverse and/or forward chronological order). As an example, the user input can have a speed and the user interface can be transitioned between display of different image frames (e.g., in a forward and/or reverse chronological order) at a speed that is positively correlated to the speed of the user input. More specifically, the user interface can be transitioned between a first image frame of the video segment to at least a second image frame of the video segment at a speed that is positively correlated to the speed of the user input. The user can control whether the image frames are displayed in a forward or reverse chronological order by controlling a direction of the user input. As an example, the user can swipe leftwards or downwards to display the image frames in a reverse chronological order. The user can swipe rightwards or upwards to display the image frames in a forward chronological order. Thus, during the rewind operation, the user can quickly and intuitively navigate the image frames of the video segment, for example to locate one or more of the frames that she wishes to save.

In some implementations, the mobile image capture device can be configured to display a thumbnail strip during the rewind operation. The thumbnail strip can include a plurality of thumbnail images. The thumbnail images can be arranged in a chronological order. A current image of the plurality of images can be highlighted or marked. The thumbnail strip can include a subset of the plurality of images of the video segment, and the subset can be indicative of a relative chronological position of the current image within the video segment (e.g., relative to temporally adjacent image frames). Thus, the thumbnail strip can provide the user with a contextual understanding of the relation of the current image within the video segment.

In some implementations, the video segment from the live video stream can be stored in the temporary image buffer in a first-in-first-out (FIFO) configuration associated with a moving time window. The moving time window can be have an associated time period (e.g., five seconds) that extends backwards in time from the current moment. In other words, the moving time window can include the previous five seconds from the current moment. The mobile image capture device can store images from the live video stream in the temporary image buffer. The mobile image capture device can discard (e.g., delete or overwrite) images from the temporary image buffer as they become older than the time period (e.g., as they "exit" the moving time window). In this respect the storage can be described as a first-in-first-out configuration. Thus, the temporary image buffer can provide temporary storage of a video segment of the moving time window.

In some implementations, the mobile image capture device can be configured to automatically begin storing the video segment without the user pressing a capture button. As an example, the video segment can be automatically stored from the live video stream in the temporary image buffer when the live video stream is provided for display in the viewfinder portion of the interface. The user can open a camera application, and in response to the camera application being opened, the mobile image capture device can begin automatically storing the video segment (e.g., without further user input).

As another example, the camera application can be operable in a variety of modes, and the video segment can be automatically stored when the camera application is operated in at least two of the modes. The video segment can be automatically stored when the camera application is first opened, regardless of whether the camera application is in an image capture mode or a video capture mode. Thus, the user could open the camera application and point the mobile image capture device at a subject. If the user then misses the moment that she intended to capture (e.g., in a video or photograph), the user can then request the rewind operation to "go back" and capture the missed moment, even if the user had not intended to use the rewind operation when she first opened the camera application.

In some implementations, the mobile image capture device can be configured to provide the user with one or more suggestions about which image frame of the video segment to save. During the rewind operation, the mobile image capture device can highlight or otherwise bring the user's attention to one or more of the image frames. As an example, a pop-up window can appear displaying previews of one or more image frames that are suggested for storage. The pop-up window can provide the user with the option of automatically storing such image frames in the future, viewing the suggested images frames in a larger window (e.g., in the entire user interface), and/or discarding the suggested image frames.

The mobile image capture device can be configured to select and recommend one or more image frames for storage, for example based on various photographic characteristics. Examples of such characteristics can include composition, lighting, and context, such as a temporal context associated with the image frame with respect to the video segment or adjacent portions of the video segment. If the user has consented to the mobile device learning about her preferences for such characteristics, the mobile image capture device can select image frames to recommend for storage based on learned information about the user's preferences for such photograph characteristics.

Importantly, the user can be provided with controls allowing the user to make an election as to both if and when systems, programs, or features described herein can enable collection of user information (e.g., preferences). In addition, certain data can be treated in one or more ways before it is stored or used, so that personally identifiable information is removed. For example, a user's identity can be treated so that no personally identifiable information can be determined for the user. Thus, the user can have control over what information is collected about the user, how that information is used, and what information is provided to the user.

In some implementations, the mobile image capture device can leverage a machine-learned image selection model to select image frames for suggestion to the user for storage. The machine-learned image selection model can be configured to receive the plurality of image frames of the video segment. In response to receipt of the plurality of image frames, the machine-learned image selection model can output a frame selection set that describes a selection of at least one of the plurality of image frames. The mobile image capture device can be configured to input the plurality of image frames of the video segment into the machine-learned image selection model. The frame selection set can be received as an output of the machine-learned image selection model. The mobile image capture device can provide a selection suggestion for display in the user interface that includes at least one of the image frames described by the frame selection set. Thus, the mobile image capture device can select images via the machine-learned image selection model and suggest the selected images for storage by the user.

In some implementations, if the user has consented, the mobile image capture device can automatically capture image frames from the live video stream without receiving any user input. As an example, the mobile image capture device can leverage a machine-learned image capture model to select one or more image frames from the live video stream for storage (e.g., in non-temporary memory). The machine-learned image capture model can be configured to receive image frames from the live video stream. In response to receipt of the image frames, the machine-learned capture model can output a capture decision that describes whether to store the image frames (e.g., in non-temporary memory). The mobile image capture device can be configured to sample the live video stream (e.g., at a regular interval) to obtain the image frames that are input into the machine-learned image capture model. The capture decision can be received as an output of the machine-learned image capture model. The machine-learned capture model can be configured to select images for capture based on a variety of factors, including, for example, characteristics of the image frames and the user's preferences, if the user has consented.

The mobile image capture device can automatically capture images based on the capture decision. Thus, the mobile image capture device can leverage the machine-learned image capture model to automatically capture image frames from the live video stream without receiving any user input.

In some implementations, the temporary image buffer can be deleted or cleared at the conclusion of the rewind operation or when a camera application associated with performing the rewind operation is closed. As an example, the user can request the rewind operation and select one or more image frames for storage in a non-temporary memory location. The rewind operation may be automatically ended upon storing of the image frame(s). Alternatively, the user can request that the rewind operation be ended, for example, by pressing a virtual "end" button that is displayed in the user interface or another suitable user input. In response, the mobile image capture device may end the rewind operation and resume providing a live video stream for display. The mobile image capture device can clear or overwrite the temporary image buffer when the live video stream is provided for display at the conclusion of the rewind operation. Alternatively, the mobile image capture device can retain the temporary image buffer from the rewind operation and begin storing a video segment from the live video stream in a secondary temporary image buffer in anticipation of a second rewind operation. In such implementations, mobile image capture device can retain temporary image buffers associated with one or more rewind operations, for example, until the camera application associated with the rewind operation is closed. When the camera application is closed, the temporary image buffer(s) may be cleared to free the resources of the device for subsequent operations.

According to another aspect of the present disclosure, a mobile image capture device can provide a live video stream for display in a viewfinder portion of the user interface, and the live video stream can include a composite environmental stream that is generated from a plurality of sources. The plurality of sources can correspond with a plurality of on-device cameras (e.g., a forward-facing camera and a rearward-facing camera). The mobile image capture device can be configured to generate the composite environmental stream by spatially arranging and/or joining (e.g., "stitching") two or more video streams from the plurality of sources. In one example, a composite environmental stream can include a narrow angle image that has been combined with portions of a wide angle image, where the portions of the wide angle image are less than an entirety of the wide angle image, and where the portions of the wide angle image surround at least a portion of a perimeter of the narrow angle image. This can enable the composite environmental stream to depict a larger environment around the scene that is depicted by the narrow angle image alone. In some implementations, the composite environmental stream can be at least in part panoramic. Thus, in one example, the composite environmental stream can depict a narrow angle image captured by a rearward-facing camera and also portions of a wide angle image captured by a frontward-facing camera (or vice versa), thereby providing imagery that depicts an environment that is both in front of and behind the mobile image capture device.

In some implementations, the user interface can present multiple live video streams within the same interface. For example, both a primary live video stream and a secondary live video stream can be presented within the same interface. Multiple video segments corresponding to the multiple live video streams can be stored in one or multiple temporary buffers. Each live video stream can directly correspond to the field of view of a camera and/or one of the live video streams can be derived from multiple cameras (or subcombinations thereof).

In some implementations, a primary live video stream can be displayed larger than a secondary live video stream. The primary live video stream can include images from a first source (e.g., the rearward-facing camera) and can be displayed in a primary viewing portion of the viewfinder portion of the user interface. The secondary live video stream can include images from a second source (e.g., the forward-facing camera) and can be displayed in a secondary viewing portion of the viewfinder. The primary viewing portion can be larger than the secondary viewing portion. For instance, the secondary viewing portion can be overlaid or superimposed over part of the primary viewing portion. For example, the secondary viewing portion can be a presented within a bubble within that is superimposed over part of the primary viewing portion, The primary and/or secondary live video stream can provide the user with greater contextual information associated with the captured image frames. As an example, the secondary live view stream can provide the user with a view of her facial expressions as she views the subject matter displayed in the primary live view stream. As another example, the secondary live view stream can act as a "rear view mirror" by providing the user with visual information about her surrounding environment when viewing the primary live video stream.

The composite environmental stream can have a wide field of view that can provide the user with visual information about the user's environment. The field of view of the composite environmental stream can be larger than respective fields of view of the primary and secondary live streams individually. As an example, the primary and secondary live streams can have complementary or overlapping fields of view. As a result, in some implementations, the composite environmental stream can have a 360 degree field of view. In one example, the composite environmental stream can include a composite of some or all of imagery captured by a narrow angle camera and also some or all of imagery captured by a wide angle camera. For example, portions of imagery captured by a wide angle camera can be added around imagery captured by a narrow angle camera. Thus, the composite environmental stream can provide the user with visual information about the surrounding environment in addition to the subject matter that the user intends to capture.

A rewind operation can be performed with respect to one or both of the streams. More specifically, a video segment that includes the composite environmental stream can be stored in a temporary image buffer, and the rewind operation can be performed with respect to the video segment. Alternatively, a primary video segment can be stored from the primary live video stream, and a secondary video segment can be stored from the secondary live video stream. In response to a user input that requests a rewind operation, the mobile image capture device can perform the rewind operation with respect to one or both of the live video streams.

The user may be able to control which source of the plurality of sources is displayed in the primary viewing portion of the viewfinder portion of the user interface. The user can exercise this control before and/or during performance of the rewind operation. As an example, the user can perform a user input that requests a change in which source is displayed in the primary viewing portion of the viewfinder. The user can touch the secondary viewing portion of the viewfinder to request that the source displayed in the secondary viewing portion be displayed in the primary viewing portion of the viewfinder. The mobile image capture device can switch the respective sources displayed in the primary and secondary viewing portions.

In some implementations, the user may be able to control (e.g., select) which source is displayed in the primary viewing portion during the rewind operation. The user may be able to store a video of the composite environmental stream that reflects her selections. More specifically, the video can switch sources during playback at the same times and in the same manner as the user controlled during the rewind operation.

As an example, the user can point a rearward-facing camera of the mobile image capture device at a subject. The forward-facing camera of the mobile image capture device can be pointed at the user. The user can request the rewind operation and view image frames from the stored video segment of a previous time interval (e.g., the previous five seconds). The user can scrub through the image frames (at least partially in a reverse order) to locate and select a portion of the video segment that she wishes to store as a video in non-temporary memory. The user can then preview the portion of the video segment that she wishes to store, for example, by viewing the portion of the video segment at a normal time rate in a forward chronological order. During this preview, the user can select which live video stream (e.g., from the forward-facing camera or the rearward-facing camera) to display in the primary viewing portion of the viewfinder. The user can then save a video in which the video stream that is displayed in the primary viewing portion of the viewfinder is changed at the same times and in the same manner as she controlled during the preview. Alternatively, the user can store a composite video in non-temporary memory that can be similarly controlled during playback at a later time. More specifically, during playback of such a composite video, the user can select which source is displayed in the primary viewing portion of the viewfinder portion of the user interface.

In some implementations, the mobile image capture device can be configured to automatically control (e.g., change or switch) which source is displayed in the primary viewing portion of the viewfinder. For example, the mobile image capture device can be configured to switch between displaying the front-facing camera or the rear-facing camera in the primary viewing portion of the viewfinder. The mobile image capture device can be configured to perform this switching during live viewing (e.g., when providing the live video stream for display in the viewfinder portion of the user interface) and/or during the rewind operation. Additionally or alternatively, the mobile image capture device can be configured to perform this switching during playback a composite video that is stored in non-temporary memory.

As an example, the mobile image capture device can leverage a machine-learned source selection model to select which source is displayed in the primary viewing portion of the viewfinder. The machine-learned source selection model can be configured to receive a first set of image frames from a first video source and a second set of image frames from a second video source. The first and second video sources can correspond to respective live video streams or stored videos of respective live video streams. The first and second video sources can correspond with live video streams from the forward-facing and rear-ward facing cameras. In response to receipt of the first and second video sources, the machine-learned source selection model can output a source selection output that describes a time-aligned indication of which source to display in the primary viewing portion of the viewfinder (e.g., when to switch between displaying a video stream from the front-facing camera to a video stream from the rear-facing camera). The mobile image capture device can be configured to input images from the plurality of sources (e.g., live video streams or stored videos) into the machine-learned source selection model. The source selection output can be received as an output of the machine-learned source selection model. The mobile image capture device can control display of the sources in the primary viewing portion and/or secondary viewing portion based on the source selection output.

Alternatively, the mobile image capture device can provide suggestions to the user regarding which source to display in the primary viewing portion at which times. Such suggestions can be associated with respective images frames or respective times within the video segment. Such suggestions can be provided during the rewind operation and/or during viewing of a stored composite video.

The systems and methods of the present disclosure provide a number of technical effects and benefits. As one example, the systems and methods described herein can perform a rewind operation using minimal computational resources, which can result in faster and more efficient execution relative to capturing and storing video in non-temporary memory and then reviewing the stored video for image frames and/or video segments to extract. For example, in some implementations, the systems and methods described herein can be quickly and efficiently performed on a user computing device such as, for example, a smartphone because of the reduced computational demands. As such, aspects of the present disclosure can improve accessibility and effectivity of video capture using such devices, for example, in scenarios in which cloud computing is unavailable or otherwise undesirable (e.g., for reasons of improving user privacy and/or reducing communication cost).

In this way, the systems and methods described herein can provide a more efficient operation of mobile image capture. By capturing and storing a segment of video in temporary memory, the efficiency with which a particular image can be extracted and stored in non-temporary memory can be improved. In particular, the capture of brief and/or unpredictable events can be improved, for example, capturing a laugh or smile, or capturing a sporting event or weather event. The systems and methods described herein thus avoid image capture operations which are less efficient, such as burst photography, or which require additional equipment such as external sound/motion triggers.

As one example, the systems and methods of the present disclosure can be included or otherwise employed within the context of an application, a browser plug-in, or in other contexts. Thus, in some implementations, the models of the present disclosure can be included in or otherwise stored and implemented by a user computing device such as a laptop, tablet, or smartphone. As yet another example, the models can be included in or otherwise stored and implemented by a server computing device that communicates with the user computing device according to a client-server relationship. For example, the models can be implemented by the server computing device as a portion of a web service (e.g., a web email service).

With reference now to the Figures, example embodiments of the present disclosure will be discussed in further detail.

Example Devices and Systems

FIG. 1A depicts a block diagram of an example computing system 100 for performing a rewind operation, according to example embodiments of the present disclosure. The system 100 includes a user computing device 102, a server computing system 130, and a training computing system 150 that are communicatively coupled over a network 180.

The user computing device 102 is generally a mobile image capture device, such as a smartphone or tablet. In other implementations, user computing device 102 can be any type of computing device, such as, for example, a personal computing device (e.g., laptop or desktop), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations. The memory 114 can also include a non-temporary memory location 120 and a temporary image buffer 122. The temporary image buffer 122 can correspond with a non-transitory computer-readable storage medium that is suited for temporary storage of information, such as RAM, for example. The non-temporary memory location 120 may correspond with a non-transitory computer-readable storage medium that is suited for non-temporary storage of information, such as flash memory device, magnetics discs, etc.

The user computing device 102 can store or include one or more machine-learned image selection models 123, machine-learned image capture models 124, and/or machine-learned selection models 125. For example, the machine-learned models 123, 124, 125 can be or can otherwise include various machine-learned models such as neural networks (e.g., deep neural networks) or other multi-layer non-linear models. Neural networks can include recurrent neural networks (e.g., long short-term memory recurrent neural networks), feed-forward neural networks, or other forms of neural networks. Example models 123, 124, 125 are discussed with reference to FIGS. 2 through 4.

In some implementations, the one or more models 123, 124, 125 can be received from the server computing system 130 over network 180, stored in the user computing device memory 114, and the used or otherwise implemented by the one or more processors 112. In some implementations, the user computing device 102 can implement multiple parallel instances of a one or more of the models 123, 124, 125 (e.g., to perform parallel operations across multiple instances of the models 123, 124, 125).

Additionally or alternatively, one or more models 140, 142, 144 can be included in or otherwise stored and implemented by the server computing system 130 that communicates with the user computing device 102 according to a client-server relationship. For example, one or more models 140, 142, 144 can be stored and implemented at the user computing device 102 and/or one or more models 140 can be stored and implemented at the server computing system 130.

The user computing device 102 can also include one or more user input component 126 that receives user input. For example, the user input component 126 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can enter a communication.

The user computing device 102 can also include one or more camera(s) 128. For example, the user computing device 102 can include a forward-facing camera and/or a rearward-facing camera. As an example, the user computing device 102 can correspond with a smartphone, and the rearward-facing camera may be positioned adjacent a display of the smartphone such that the rearward-facing camera points back at user when the user is holding the smartphone and viewing the display. Similarly, the forward-facing camera can be positioned such that the forward-facing camera points away from the user when the user is holding the smartphone and viewing the display. The user computing device 102 can include any number of different types and arrangements of cameras 128 with various and differing characteristics. In one example, the device 102 can have multiple forward-facing cameras and/or multiple rearward-facing cameras. The cameras 128 can be narrow angle cameras, wide angle cameras, or a combination thereof. The cameras 128 can have different filters and/or be receptive to different wavelengths of light (e.g., one infrared camera and one visible light spectrum camera). In one example, the device 102 can have a first rearward-facing camera (e.g., with a wide-angle lens and/or f/1.8 aperture), a second rearward-facing camera (e.g., with a telephoto lens and/or f/2.4 aperture), and a frontward-facing camera (e.g., with a wide-angle lens and/or f/2.2 aperture). In another particular example, the device 102 can include the following cameras: a rearward-facing camera (e.g., with 12.2-megapixel, laser autofocus, and/or dual pixel phase detection), a first frontward-facing camera (e.g., with 8.1-megapixel and/or f/1.8 aperture), and a second frontward-facing camera (e.g., with 8.1-megapixel, wide-angle lens, and/or variable f/1.8 and f/2.2 aperture).

The server computing system 130 can include one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140, 142, 144. For example, the models 140, 142, 144 can be or can otherwise include various machine-learned models such as neural networks (e.g., deep recurrent neural networks) or other multi-layer non-linear models. Example models 140, 142, 144 are discussed with reference to FIGS. 2 through 4.

The server computing system 130 can train the models 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains one or more of the machine-learned models 140, 142, 144 stored at the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train one or more of the models 140, 142, 144 based on a set of training data 162. The training data 162 can include labeled or non-labeled sets of model input and/or output for example as described below with reference to FIGS. 2 through 4.

In some implementations, if the user has provided consent, the training examples can be provided by the user computing device 102 (e.g., based on communications previously provided by the user of the user computing device 102). Thus, in such implementations, the model 140, 142, 144 provided to the user computing device 102 can be trained by the training computing system 150 on user-specific communication data received from the user computing device 102. In some instances, this process can be referred to as personalizing the model. For example, one or more of the models 140, 142, 144 can be trained based on user preferences (e.g., for photographic characteristics).

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 140, 142, 144 can be both trained and used locally at the user computing device 102. In some of such implementations, the user computing device 102 can implement the model trainer 160 to personalize the models 140, 142, 144 based on user-specific data.

Figure 1B:
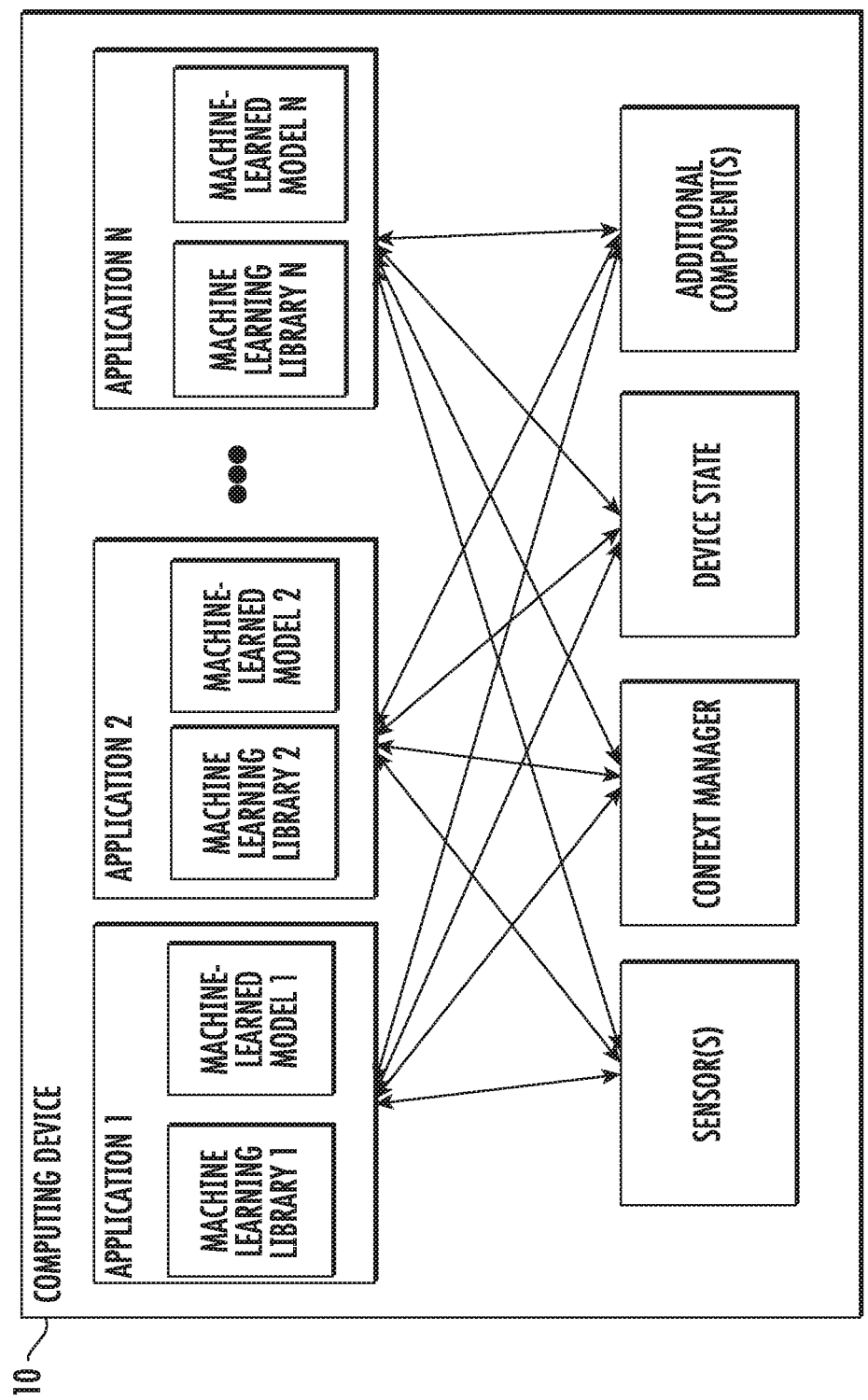
FIG. 1B depicts a block diagram of an example computing system according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
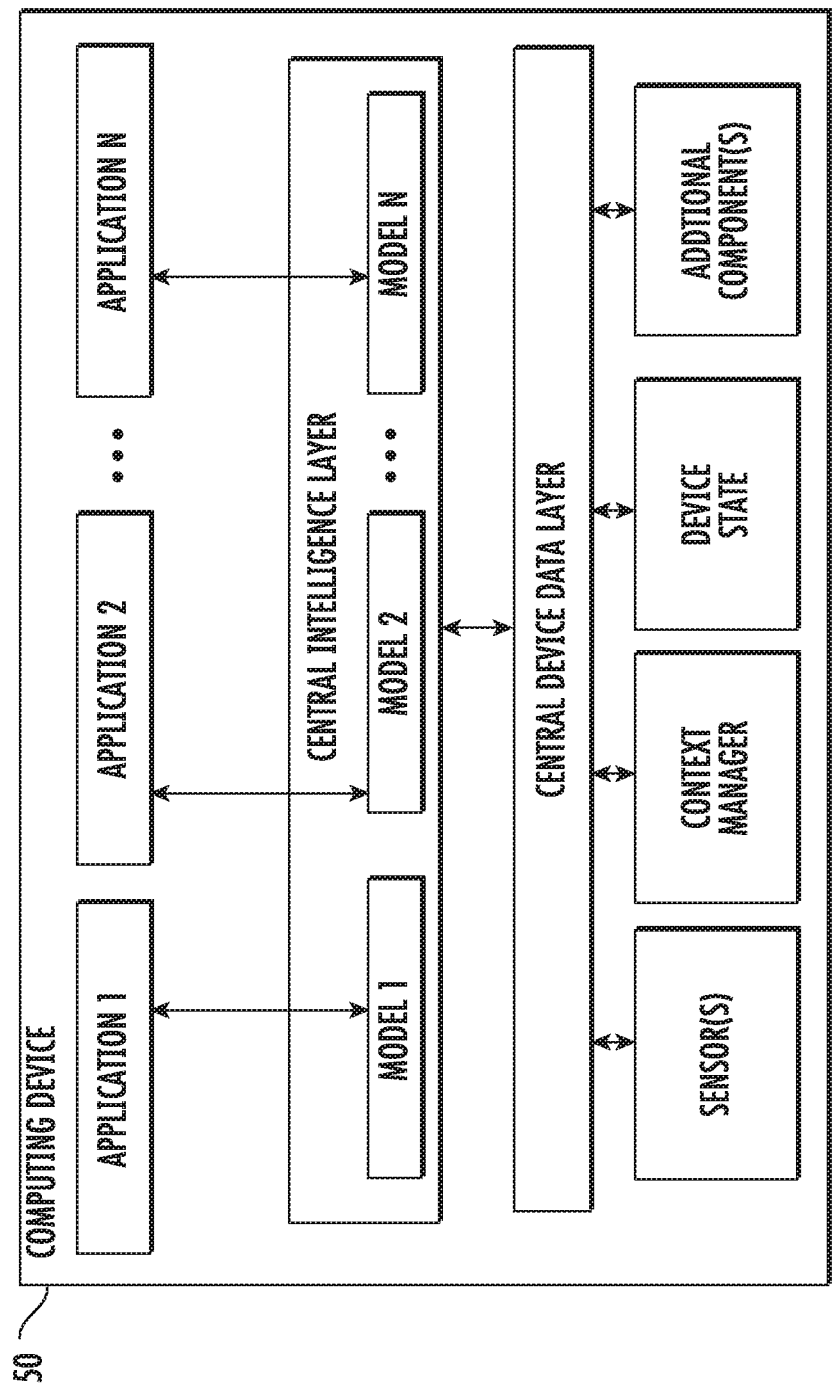
FIG. 1C depicts a block diagram of an example computing system according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
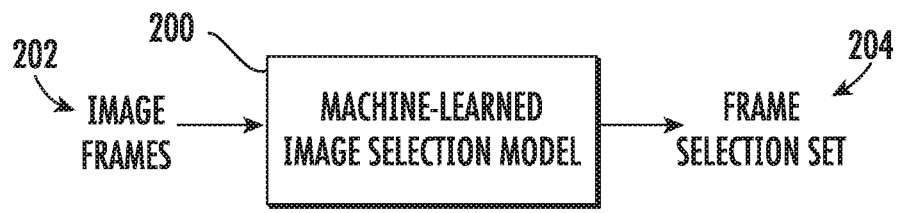
FIG. 2 depicts a machine-learned image selection model according to example embodiments of the present disclosure.

FIG. 2 depicts a block diagram of an example machine-learned image selection model 200 according to example embodiments of the present disclosure. In some implementations, the machine-learned image selection model 200 can be configured to receive a plurality of image frames 202 (e.g., of a video segment). In response to receipt of the plurality of image frames 202, the machine-learned image selection model 200 can output a frame selection set 204 that describes a selection of at least one of the plurality of image frames 202.

Figure 3:
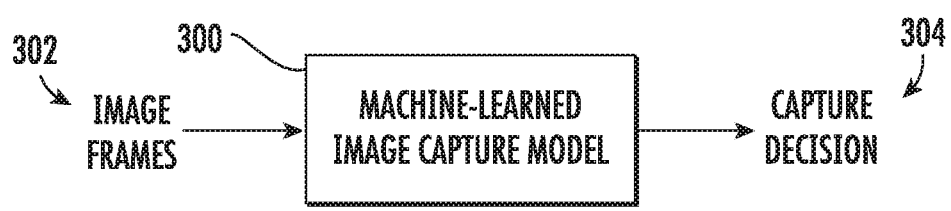
FIG. 3 depicts a machine-learned image capture model according to example embodiments of the present disclosure.

FIG. 3 depicts a block diagram of an example machine-learned image capture model 300. The machine-learned image capture model 300 can be configured to receive image frames 302 (e.g., from a live video stream). In response to receipt of the image frames 302, the machine-learned capture model can output a capture decision 304 that describes whether to store the image frames (e.g., in the non-temporary memory location 120 described above with reference to FIG. 1A).

Figure 4:
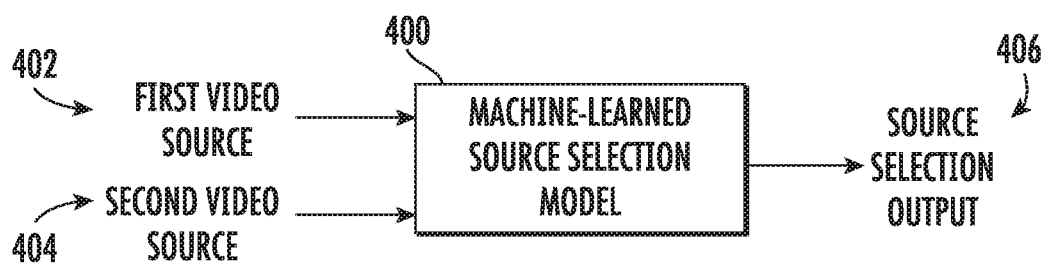
FIG. 4 depicts a machine-learned source selection model according to example embodiments of the present disclosure.

FIG. 4 depicts a block diagram of an example machine-learned source selection model 400 to select which source is displayed in a primary viewing portion of a viewfinder portion of a user interface, for example as described below with reference to FIG. 6. The machine-learned source selection model 400 can be configured to receive a first set of image frames from a first video source 402 and a second set of image frames from a second video source 404. The first and second video sources 402, 404 can correspond to respective live video streams or stored videos of respective live video streams. As an example, the first and second video sources 402, 404 can correspond with live video streams from the forward-facing and rear-ward facing cameras 128, respectively. In response to receipt of the first and second video sources 402, 404, the machine-learned source selection model 400 can output a source selection output 406 that describes a time-aligned indication of which source to display in a primary viewing portion of a viewfinder (e.g., when to switch between displaying a video stream from the front-facing camera to a video stream from the rear-facing camera), for example as described below with reference to FIG. 6.

Generally, the present disclosure is directed to systems and methods that provide an improved user experience for capturing images and/or video with a handheld computing device, such as a smartphone or tablet. The systems and methods described herein can provide the user with the ability to "rewind" time and capture video or images from previous moments for which the user failed to explicitly operate the device to capture. This capability can allow the user to capture the "perfect shot," even after the moment has passed.

Figure 5A:
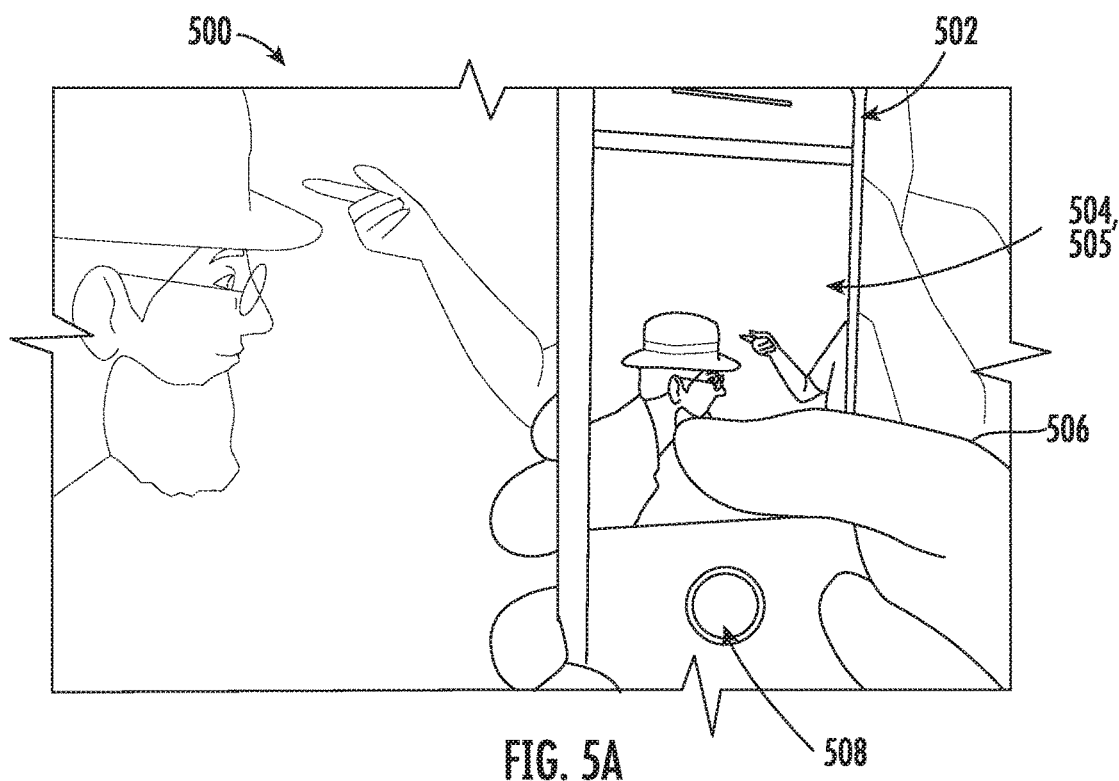
FIG. 5A depicts an example user interface prior to performance of a rewind operation according to example embodiments of the present disclosure.
Figure 5B:
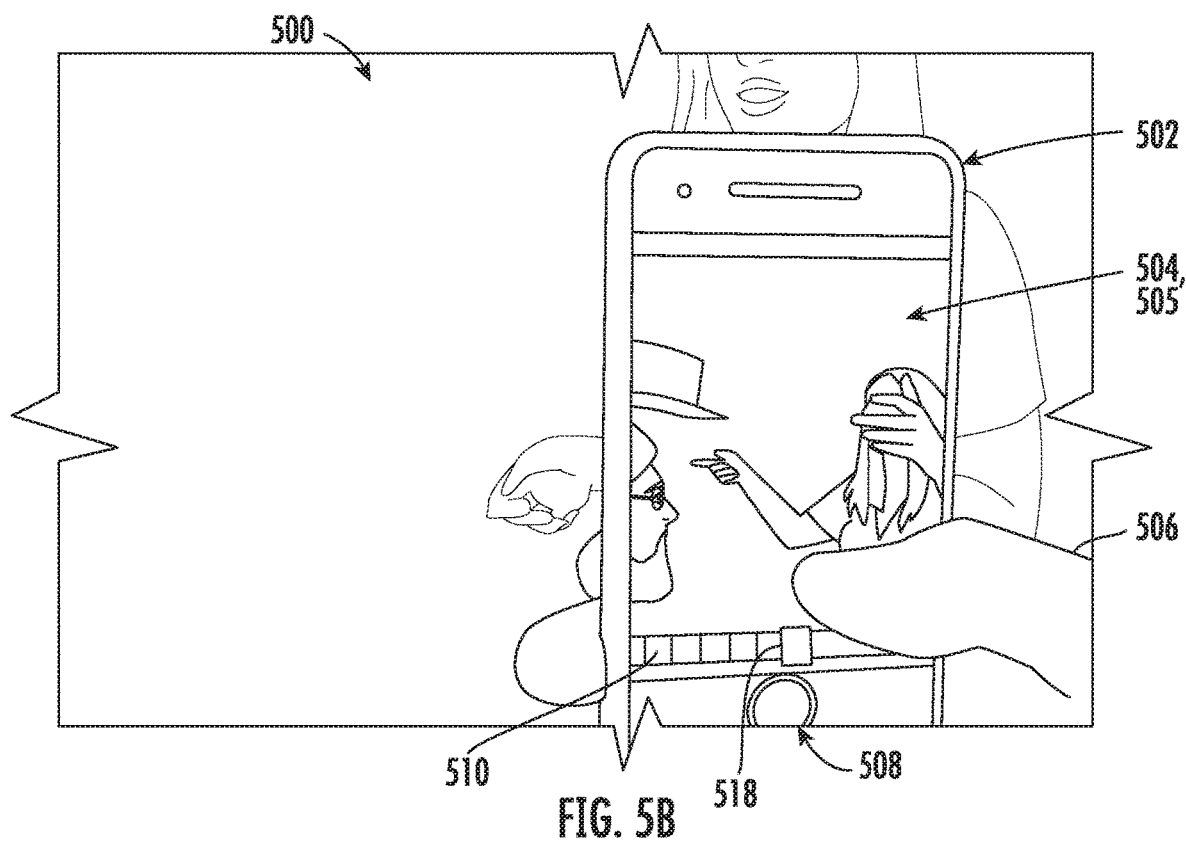
FIG. 5B depicts an example user interface during performance of a rewind operation according to example embodiments of the present disclosure.

Referring to FIGS. 5A and 5B, in one example, a user can point a camera of a handheld device 502 at a subject of interest and can view a live stream from the camera in a viewfinder portion 504 of a display 505 of the device 502. In this example, the subject of interest is a woman tossing a hat onto a man's head. The device 502 can temporarily store a video segment from the live video stream (e.g., a set of captured images) in the temporary image buffer 122 (FIG. 1A). Instead of attempting to press a capture button 508 (AKA a "shutter-release button") at the precise moment that the user wishes to capture, she can watch until that moment has passed. Then, the user can request a rewind operation by providing a user input (e.g., a swipe or other motion or gesture as illustrated by a hand 506 of the user contacting the display screen 505). In response, the device 502 can instantly (or quickly) provide the user with the ability to "rewind time" (as shown in FIG. 5B) to review prior moments that were displayed on the viewfinder portion 504. The prior moments can be displayed in a reverse chronological order and/or the user can control the playback by, for example, scrolling through the video segment in a scrubbing operation. She can select one or more of the images, for example as a photograph or a video that captures the "perfect shot" that she missed, and the selected image(s) can be saved to a non-temporary memory location 120 of the device 102 (FIG. 1A). In such fashion, the proposed system enables the user to capture the "perfect shot" even after the moment has passed but does not flood the user's camera roll with unwanted images or require the user to manually inspect and delete a large number of unwanted photographs.

Figure 5C:
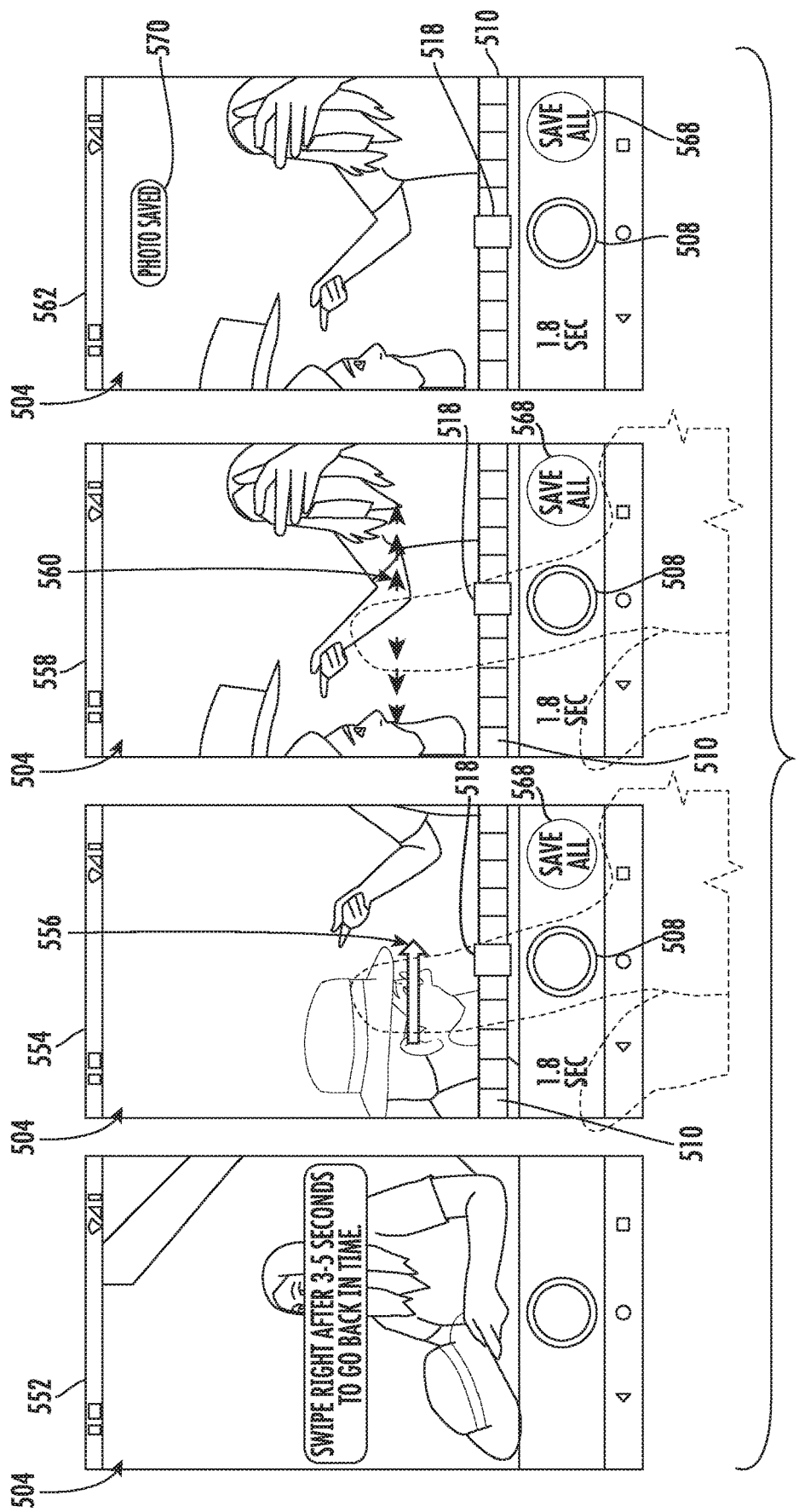
FIG. 5C depicts an example user interface at various stages during performance of a rewind operation according to example embodiments of the present disclosure.

More particularly, referring to FIG. 5C, according to one aspect of the present disclosure, a mobile image capture device (e.g., a smartphone or a tablet) can include an image capture system operable to capture image frames. In FIG. 5C, a user interface of the mobile image capture device is illustrated in four different chronological frames 552, 554, 558, 562. The mobile image capture device can be configured to perform operations. Referring to the first frame 552, the operations can include providing a live video stream for display in the viewfinder portion 504 of the user interface. The live video stream can depict at least a portion of a current field of view of the image capture system of the mobile image capture device. As an example, the mobile image capture device can include a camera, such as a forward-facing and/or rearward-facing camera (e.g., corresponding to the camera 128 described above with reference to FIG. 1A). The mobile image capture device can be configured to provide a live stream of images captured by one or more of the camera(s) on the viewfinder portion 504 of the user interface. The mobile image capture device can include a touch-sensitive display screen that displays the user interface.

The mobile image capture device can be configured to store a video segment from the live video stream in the temporary image buffer 122 (FIG. 1A). The video segment can include a plurality of image frames captured by the image capture system. As an example, the video segment can include a moving time window, for example, of a previous time period before the present time.

Referring to frame 554 of FIG. 5C, a user input can be received that is directed to the viewfinder portion 504 of the user interface and that requests a rewind operation. The user input can include a user touch action with respect to the touch-sensitive display screen. For example, the user input is illustrated in frame 554 of FIG. 5C by a dotted outline of a user's hand and accompanying arrow 556 representing a swipe input with respect to the touch-sensitive display screen. As other examples, the user tap or otherwise touch the touch-sensitive display screen. In response to receipt of the user input, the mobile image capture device can perform the rewind operation in the viewfinder portion of the user interface with respect to the video segment.

Referring to frame 558 in FIG. 5C, during the rewind operation, at least two of the image frames of the video segment can be provided for display in the user interface in a reverse chronological order. As an example, at least a portion of the video segment can be played backwards at a time rate corresponding to a normal forward playback speed. As another example, the images of the video segment can be displayed in a manner that is responsive to continued user input (e.g., via the touchscreen), for example in a scrubbing operation (illustrated by a dotted outline of a user's hand and accompanying set of arrows 560 pointing to the left and right).

The user can navigate between various image frames of the video segment (e.g., in a reverse and/or forward chronological order) via the scrubbing operation (represented by arrows 560). As an example, the user input can have a speed and the user interface can be transitioned between display of different image frames (e.g., in a forward and/or reverse chronological order) at a speed that is positively correlated to the speed of the user input. More specifically, the user interface can be transitioned between a first image frame of the video segment to at least a second image frame of the video segment at a speed that is positively correlated to the speed of the user input. The user can control whether the image frames are displayed in a forward or reverse chronological order by controlling a direction of the user input. As an example, the user can swipe leftwards or downwards to display the image frames in a reverse chronological order. The user can swipe rightwards or upwards to display the image frames in a forward chronological order. Thus, during the rewind operation, the user can quickly and intuitively navigate the image frames of the video segment, for example to locate one or more of the frames that she wishes to save.

In some implementations, the mobile image capture device can be configured to display a thumbnail strip 510 during the rewind operation. The thumbnail strip 510 can include a plurality of thumbnail images. The thumbnail images can be arranged in a chronological order. A current image 518 of the plurality of images can be highlighted or otherwise marked. The thumbnail strip 510 can include a subset of the plurality of images of the video segment, and the subset can be indicative of a relative chronological position of the current image within the video segment (e.g., relative to temporally adjacent image frames). Thus, the thumbnail strip 510 can provide the user with a contextual understanding of the relation of the current image within the video segment.

Referring to frame 562 of FIG. 5C, in some implementations, the mobile image capture device can be configured to receive a user selection of one of the image frames and store the selected image frame(s) into the non-temporary memory location 120 (FIG. 1A). In other words, the user can navigate the image frames of the video segment and select which image frame(s) to store (e.g., as a photograph or video) for later viewing. During the rewind operation, the user can selectively view image frames of the video segment. When the user sees a frame that she would like to save as a photograph, the user can provide a user input that requests that the photograph be stored in non-temporary memory (e.g., the non-temporary memory location 120 described with reference to FIG. 1A). An example of such a user input includes tapping a virtual capture button 508 displayed in the user interface. Additionally, in some implementations, the user can save all temporarily stored images into the non-temporary memory location 120, for example by tapping a "save all" button 568. The mobile image capture device can provide a notification 570 in the user interface that indicates that the image(s) have been saved.

Figure 5D:
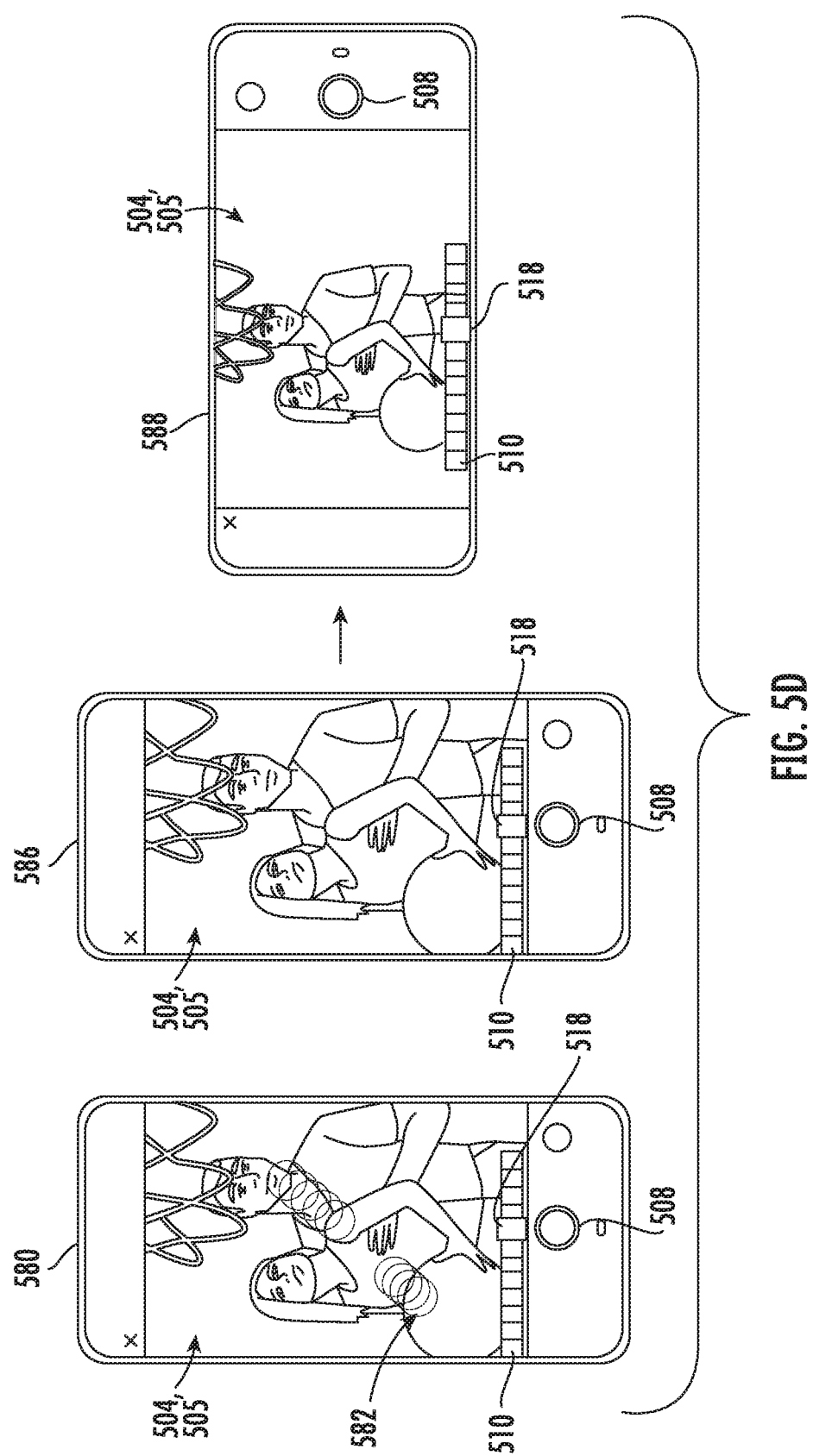
FIG. 5D depicts an example user interface during editing of an image frame to be stored according to example embodiments of the present disclosure.

Referring to FIG. 5D, in some implementations, the mobile image capture device can allow the user to edit one or more image frames during the rewind operation (e.g., prior to storage in non-temporary memory). FIG. 5D includes multiple frames 580, 586, 588 of the mobile image capture device at various stages of editing an image of a man lifting a girl up to "dunk" a basketball. Referring to frame 580 of FIG. 5D, the user can perform a user input that requests a cropping or zooming function with respect to the currently displayed image frame. As an example, the user can perform a two-finger "pinching motion" user input (represented by a series of circles 582 in frame 580 of FIG. 5D) to control the cropping/zooming function. More specifically, the mobile image capture device may save an image file to the non-temporary memory location 120 that corresponds to the portions of the image that is displayed in the user interface. The user can request that the image capture device save the image by tapping the capture button 508.

Frames 586 and 588 of FIG. 5D illustrate another technique for editing one or more image frames during the rewind operation. The user can rotate the mobile image capture device from a first orientation, for example as shown in frame 586, to a second orientation, for example as shown in frame 588. The first orientation (e.g., a portrait orientation) can be associated with a first image aspect ratio (e.g., a portrait aspect ratio). The second orientation (e.g., a landscape orientation) can be associated with a second image aspect ratio (e.g., a landscape aspect ratio). In response, the mobile image capture device can change from displaying the currently displayed image frame in the first image aspect ratio to the second image aspect ratio. The user can then save the image as currently displayed in the viewfinder, for example, by tapping the capture button 508.

In some implementations, the mobile image capture device can capture image frames having a wide field of view (e.g., using a wide angle camera). The field of view of the image frames can be larger than first image aspect ratio and/or second image aspect ratio (e.g., wider than the landscape aspect ratio and/or taller than the portrait aspect ratio). When displaying the image frame(s) in the portrait orientation, the mobile image capture device can display a portion of the image frame(s) (e.g., a portrait-cropped version) having the portrait aspect ratio. Similarly, when displaying the image frame(s) in the landscape orientation, the mobile image capture device can display a portion of the image frame(s) (e.g., a landscape-cropped version) having the landscape aspect ratio. Once the user has finished editing the image frame(s), the image frames may be stored in non-temporary memory, for example in response to the user tapping the capture button 508. Thus, the user may quickly crop the image frame(s) prior to storage for later viewing by simply rotating the mobile image capture device during the rewind operation. Thus, in some implementations, the entirety of the image frame(s) can be stored in the temporary image buffer and the user can spatially explore/modify and edit within such image frame(s) after-the-fact during the rewind operation.

As yet another example, the user can perform a user input that requests an adjustment to one or more characteristics of the image frame(s) (e.g., brightness, contrast, color saturation, etc.) prior to storing the image frame(s) in non-temporary memory. The mobile image capture device may be configured to allow the user to perform a variety of suitable image or video editing functions to one or more image frame(s) of the video segment prior to storage in non-temporary memory location.

In some implementations, the user can initiate the rewind operation, store one or more image frames, and end the rewind operation with a single gesture. As an example, the user can initiate a swipe gesture with her finger on the touchscreen to request the rewind operation. The user can maintain contact between her finger and the touchscreen (e.g., while performing a scrubbing operation) until an image frame is displayed that she would like to save as a photograph. She can then lift her finger from the touchscreen to request that the currently displayed image frame be saved into non-temporary memory as a photograph. Lifting her finger from the touchscreen can also optionally end the rewind operation. In response, the mobile image capture device can resume displaying the live video stream in the viewfinder portion of the user interface.

The user can similarly save a portion of the video segment in the non-temporary memory during the rewind operation for later viewing. For example, during the rewind operation the user can mark a beginning and an end of a portion that she wishes to save. The user can mark the beginning and ending using a variety of user input actions, including, for example, pressing a virtual marker button, momentarily lifting her finger from the touchscreen, or any other suitable gesture or input.

In some implementations, the video segment from the live video stream can be stored in the temporary image buffer 122 (FIG. 1A) in a first-in-first-out (FIFO) configuration associated with a moving time window. The moving time window can be have an associated time period (e.g., five seconds) that extends backwards in time from the current moment. In other words, the moving time window can include the previous five seconds from the current moment. The mobile image capture device can store images from the live video stream in the temporary image buffer 122 (FIG. 1A). The mobile image capture device can discard (e.g., delete or overwrite) images from temporary memory (e.g., the temporary image buffer 122 described above with reference to FIG. 1A) as such images become older than the time period (e.g., as they "exit" the moving time window). In this respect, the storage can be described as a first-in-first-out configuration. Thus, the temporary image buffer 122 (FIG. 1A) can provide temporary storage of a video segment of the moving time window.

In some implementations, the mobile image capture device can be configured to automatically begin storing the video segment without the user requesting such storage, for example by pressing a capture button (e.g., the capture button 508 described above with reference to FIG. 5A through 5D). As an example, the video segment can be automatically stored from the live video stream in the temporary image buffer 122 (FIG. 1A) when the live video stream is provided for display in the viewfinder portion of the interface. The user can open a camera application, and in response to the camera application being opened, the mobile image capture device can begin automatically storing the video segment (e.g., without further user input).

As another example, the camera application can be operable in a variety of modes, and the video segment can be automatically stored when the camera application is operated in at least two of the modes. The video segment can be automatically stored when the camera application is first opened, regardless of whether the camera application is in an image capture mode or a video capture mode. Thus, the user could open the camera application and point the mobile image capture device at a subject. If the user then misses the moment that she intended to capture (e.g., in a video or photograph), the user can then request the rewind operation to "go back" and capture the missed moment, even if the user had not intended to use the rewind operation when she first opened the camera application.

Figure 5E:
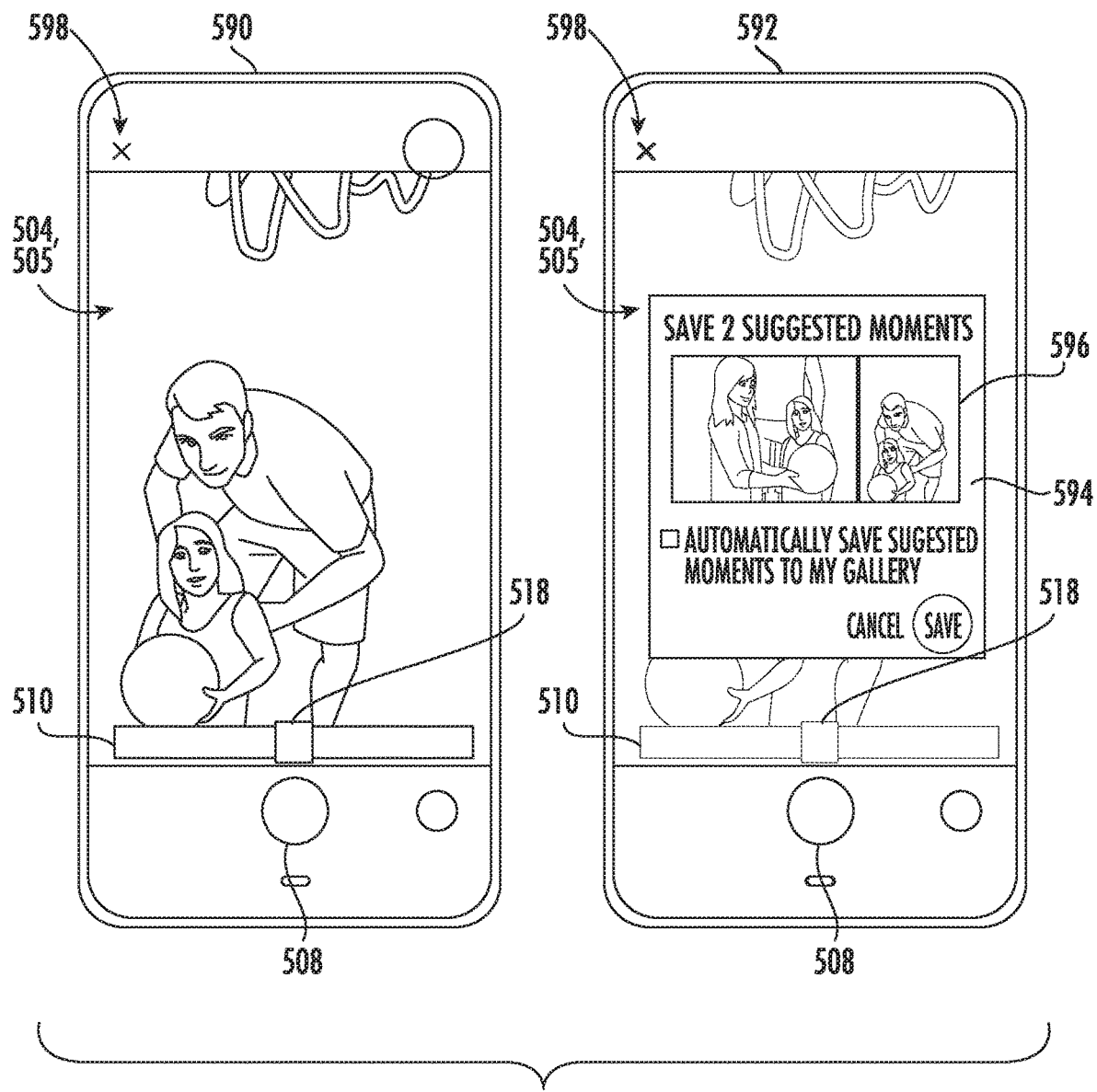
FIG. 5E depicts an example user interface displaying a pop-up window suggesting image frames for storage during performance of a rewind operation according to example embodiments of the present disclosure.

Referring to FIG. 5E, in some implementations, the mobile image capture device can be configured to provide the user with one or more suggestions about which image frame of the video segment to save. Frame 590 of FIG. 5E depicts the mobile image capture device during the rewind operation. When the user is reviewing potential images to save, the mobile image capture device can highlight or otherwise bring the user's attention to one or more of the image frames. As an example, referring to frame 592 of FIG. 5E, a pop-up window 594 can appear displaying previews of one or more image frames 596 that are suggested for storage. The pop-up window 594 can provide the user with the option of automatically storing such image frames in the future, viewing the suggested images frames in a larger window (e.g., in the entire user interface), saving the suggested image frames and/or discarding the suggested image frames.

The mobile image capture device can be configured to select and recommend one or more image frames for storage, for example based on various photographic characteristics. Examples of such characteristics can include composition, lighting, and context, such as a temporal context associated with the image frame with respect to the video segment or adjacent portions of the video segment. If the user has consented to the mobile device learning about her preferences for such characteristics, the mobile image capture device can select image frames to recommend for storage based on learned information about the user's preferences for such photograph characteristics.

Importantly, the user can be provided with controls allowing the user to make an election as to both if and when systems, programs, or features described herein can enable collection of user information (e.g., preferences). In addition, certain data can be treated in one or more ways before it is stored or used, so that personally identifiable information is removed. For example, a user's identity can be treated so that no personally identifiable information can be determined for the user. Thus, the user can have control over what information is collected about the user, how that information is used, and what information is provided to the user.

In some implementations, the mobile image capture device can leverage a machine-learned image selection model, for example as described with reference to FIG. 2, to select image frames for suggestion to the user for storage. Referring back to FIG. 2, the mobile image capture device can be configured to input a plurality of image frames 202 of a video segment into the machine-learned image selection model 200. The frame selection 204 set can be received as an output of the machine-learned image selection model 200. The mobile image capture device can provide a selection suggestion for display in the user interface (e.g., in the pop-up window 594 described above) that includes at least one of the image frames described by the frame selection set 204. Thus, the mobile image capture device can select images via the machine-learned image selection model 200 and suggest the selected images for storage by the user.

In some implementations, if the user has consented, the mobile image capture device can automatically capture image frames from the live video stream without receiving any user input. The mobile image capture device can leverage a machine-learned image capture model 300, for example as described with reference to FIG. 3, to select one or more image frames from the live video stream for storage (e.g., in the non-temporary memory location 120). For example, referring again to FIG. 3, the machine-learned image capture model can be configured to receive image frames 302 from the live video stream. In response to receipt of the image frames 302, the machine-learned capture model 300 can output a capture decision 304 that describes whether to store the image frames (e.g., in the non-temporary memory location 120). The mobile image capture device can be configured to sample the live video stream (e.g., at a regular interval) to obtain the image frames 302 that are input into the machine-learned image capture model 300. The capture decision can be received as an output of the machine-learned image capture model 300. The machine-learned capture model 300 can be configured to select images for capture based on a variety of factors, including, for example, characteristics of the image frames and the user's preferences, if the user has consented.

The mobile image capture device can automatically capture images based on the capture decision. Thus, the mobile image capture device can leverage the machine-learned image capture model 300 to automatically capture image frames from the live video stream without receiving any user input.

In some implementations, the temporary image buffer 122 can be deleted or cleared at the conclusion of the rewind operation or when a camera application associated with performing the rewind operation is closed. As an example, the user can request the rewind operation and select one or more image frames for storage in the non-temporary memory location 120. The rewind operation may be automatically ended upon storing of the image frame(s). Alternatively, the user can request that the rewind operation be ended, for example, by pressing a virtual "end" button (e.g., represented by an "X" 598 in FIG. 5E) that can be displayed in the user interface. In response, the mobile image capture device may end the rewind operation and resume providing a live video stream for display. The mobile image capture device can clear or overwrite the temporary image buffer 122 when the live video stream is provided for display at the conclusion of the rewind operation. Alternatively, the mobile image capture device can retain the temporary image buffer 122 from the rewind operation and begin storing a video segment from the live video stream in a secondary temporary image buffer in anticipation of a second rewind operation. In such implementations, mobile image capture device can retain temporary image buffers associated with one or more rewind operations, for example, until the camera application associated with the rewind operation is closed. When the camera application is closed, the temporary image buffer(s) may be cleared to free the resources of the device for subsequent operations.

Figure 6:
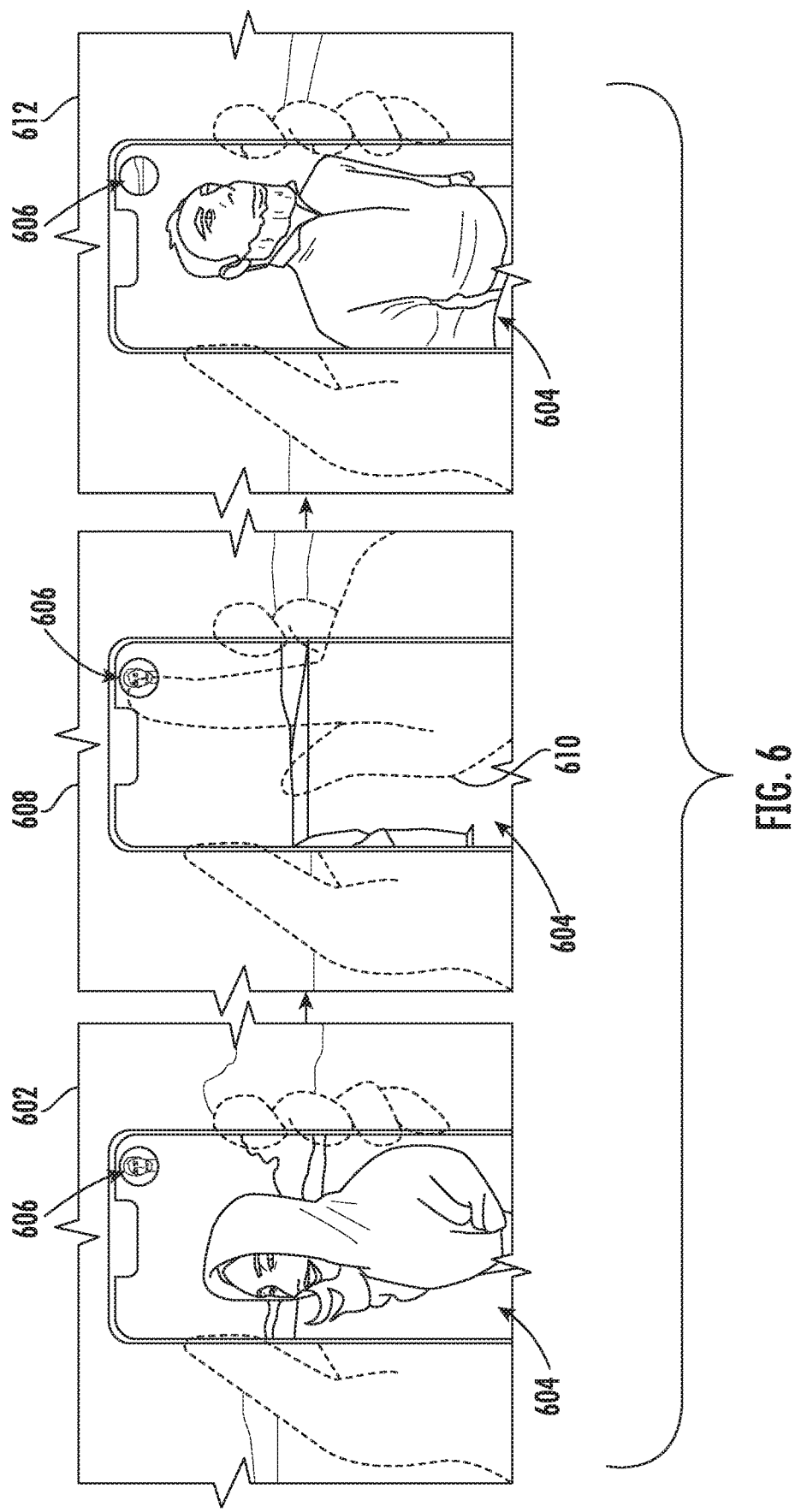
FIG. 6 depicts an example user interface at various stages during a switching operation associated with a primary and secondary live video feed according to example embodiments of the present disclosure.

Referring to FIG. 6, according to another aspect of the present disclosure, a mobile image capture device can provide a live video stream for display in a viewfinder portion of the user interface, and the live video stream can include a composite environmental stream that is generated from a plurality of sources. The plurality of sources can correspond with a plurality of on-device cameras (e.g., a forward-facing camera and a rearward-facing camera). The mobile image capture device can be configured to generate the composite environmental stream by spatially arranging and/or joining (e.g., "stitching") two or more video streams from the plurality of sources.

In some implementations, the user interface can present multiple live video streams within the same interface. For example, both a primary live video stream and a secondary live video stream can be presented within the same interface. Multiple video segments corresponding to the multiple live video streams can be stored in one or multiple temporary buffers. Each live video stream can directly correspond to the field of view of a camera and/or one of the live video streams can be derived from multiple cameras (or subcombinations thereof).

In some implementations, the primary live video stream can be displayed larger than the secondary live video stream. The primary live video stream can include images from a first source (e.g., the rearward-facing camera) and can be displayed in a primary viewing portion 604 of the viewfinder portion of the user interface. The secondary live video stream can include images from a second source (e.g., the forward-facing camera) and can be displayed in a secondary viewing portion 606 of the viewfinder. The primary viewing portion 604 can be larger than the secondary viewing portion 606. For instance, the secondary viewing portion 606 can be overlaid or superimposed over part of the primary viewing portion 604. For example, the secondary viewing portion 606 can be a presented within a bubble within that is superimposed over part of the primary viewing portion 604.

The primary and/or secondary live video stream can provide the user with greater contextual information associated with the captured image frames. As an example, the secondary live view stream can provide the user with a view of his facial expressions as he views the subject matter displayed in the primary live view stream, for example as illustrated in a first frame 602 of FIG. 6. As another example, the secondary live view stream (in the secondary viewing portion 606) can act as a "rear view mirror" by providing the user with visual information about his surrounding environment when viewing the primary live video stream, for example as illustrated in the second frame 608 of FIG. 6

The composite environmental stream can have a wide field of view that can provide the user with visual information about the user's environment. The field of view of the composite environmental stream can be larger than respective fields of view of the primary and secondary live streams individually. As an example, the primary and secondary live streams can have complementary or overlapping fields of view. As a result, in some implementations, the composite environmental stream can have a 360 degree field of view. In one example, the composite environmental stream can include a composite of some or all of imagery captured by a narrow angle camera and also some or all of imagery captured by a wide angle camera. For example, portions of imagery captured by a wide angle camera can be added around imagery captured by a narrow angle camera. Thus, the composite environmental stream can provide the user with visual information about the surrounding environment in addition to the subject matter that the user intends to capture.

A rewind operation can be performed with respect to one or both of the streams. More specifically, a video segment that includes the composite environmental stream can be stored in a temporary image buffer, and the rewind operation can be performed with respect to the video segment. Alternatively, a primary video segment can be stored from the primary live video stream, and a secondary video segment can be stored from the secondary live video stream. In response to a user input that requests a rewind operation, the mobile image capture device can perform the rewind operation with respect to one or both of the live video streams.

Referring to frame 608 of FIG. 6, the user may be able to control which source of the plurality of sources is displayed in the primary viewing portion 604 of the viewfinder portion of the user interface. The user can exercise this control before and/or during performance of the rewind operation. As an example, the user can perform a user input that requests a change in which source is displayed in the primary viewing portion of the viewfinder. The user can touch the secondary viewing portion 606 of the viewfinder to request that the source displayed in the secondary viewing portion be displayed in the primary viewing portion of the viewfinder, for example as illustrated by a dotted outline of a user's hand 610 in frame 608 of FIG. 6. The mobile image capture device can switch the respective sources displayed in the primary and secondary viewing portions 604, 606, for example as illustrated in frame 612 of FIG. 6.

In some implementations, the user may be able to control (e.g., select) which source is displayed in the primary viewing portion during the rewind operation. The user may be able to store a video of the composite environmental stream that reflects his selections. More specifically, the video can switch sources during playback at the same times and in the same manner as the user controlled during the rewind operation.

As an example, the user can point a rearward-facing camera of the mobile image capture device at a subject. The forward-facing camera of the mobile image capture device can be pointed at the user. The user can request the rewind operation and view image frames from the stored video segment of a previous time interval (e.g., the previous five seconds). The user can scrub through the image frames (at least partially in a reverse order), for example as described above with reference to frame 558 of FIG. 5C, to locate and select a portion of the video segment that he wishes to store as a video in non-temporary memory. The user can then preview the portion of the video segment that he wishes to store, for example, by viewing the portion of the video segment at a normal time rate in a forward chronological order. During this preview, the user can select which live video stream (e.g., from the forward-facing camera or the rearward-facing camera) to display in the primary viewing portion 604 of the viewfinder. The user can then save a video in which the video stream that is displayed in the primary viewing portion 604 of the viewfinder is changed at the same times and in the same manner as he controlled during the preview. Alternatively, the user can store a composite video in non-temporary memory that can be similarly controlled during playback at a later time. More specifically, during playback of such a composite video, the user can select which source is displayed in the primary viewing portion 604 of the viewfinder portion of the user interface.

In some implementations, the mobile image capture device can be configured to automatically control (e.g., change or switch) which source is displayed in the primary viewing portion 604 of the viewfinder. For example, the mobile image capture device can be configured to switch between displaying the front-facing camera or the rear-facing camera in the primary viewing portion 604 of the viewfinder. The mobile image capture device can be configured to perform this switching during live viewing (e.g., when providing the live video stream for display in the viewfinder portion of the user interface) and/or during the rewind operation. Additionally or alternatively, the mobile image capture device can be configured to perform this switching during playback of a composite video that is stored in non-temporary memory.

As an example, the mobile image capture device can leverage a machine-learned source selection model, for example as described with respect to FIG. 4, to select which source is displayed in the primary viewing portion 604 of the viewfinder. Referring again to FIG. 4, the machine-learned source selection model 400 can be configured to receive a first set of image frames from the first video source 402 and a second set of image frames from a second video source 404. The first and second video sources 402, 404 can correspond to respective live video streams or stored videos of respective live video streams. The first and second video sources 402, 404 can correspond with live video streams from the forward-facing and rear-ward facing cameras. In response to receipt of the first and second video sources 402, 404, the machine-learned source selection model 400 can output the source selection output 406 that describes a time-aligned indication of which source to display in the primary viewing portion 604 of the viewfinder (e.g., when to switch between displaying a video stream from the front-facing camera to a video stream from the rear-facing camera). The mobile image capture device can be configured to input images from the plurality of sources (e.g., live video streams or stored videos) into the machine-learned source selection model 400. The source selection output 406 can be received as an output of the machine-learned source selection model 400. Referring again to FIG. 6, the mobile image capture device can control display of the sources in the primary viewing portion 604 and/or secondary viewing portion 606 based on the source selection output 406.

Alternatively, the mobile image capture device can provide suggestions to the user regarding which source to display in the primary viewing portion 604 at which times. Such suggestions can be associated with respective images frames or respective times within the video segment. Such suggestions can be provided during the rewind operation and/or during viewing of a stored composite video.

The systems and methods of the present disclosure provide a number of technical effects and benefits. As one example, the systems and methods described herein can perform a rewind operation using minimal computational resources, which can result in faster and more efficient execution relative to capturing and storing video in non-temporary memory and then reviewing the stored video for image frames and/or video segments to extract. For example, in some implementations, the systems and methods described herein can be quickly and efficiently performed on a user computing device such as, for example, a smartphone because of the reduced computational demands. As such, aspects of the present disclosure can improve accessibility and effectivity of video capture using such devices, for example, in scenarios in which cloud computing is unavailable or otherwise undesirable (e.g., for reasons of improving user privacy and/or reducing communication cost).

In this way, the systems and methods described herein can provide a more efficient operation of mobile image capture. By capturing and storing a segment of video in temporary memory, the efficiency with which a particular image can be extracted and stored in non-temporary memory can be improved. In particular, the capture of brief and/or unpredictable events can be improved, for example, capturing a laugh or smile, or capturing a sporting event or weather event. The systems and methods described herein thus avoid image capture operations which are less efficient, such as burst photography, or which require additional equipment such as external sound/motion triggers.

Example Method

Figure 7:
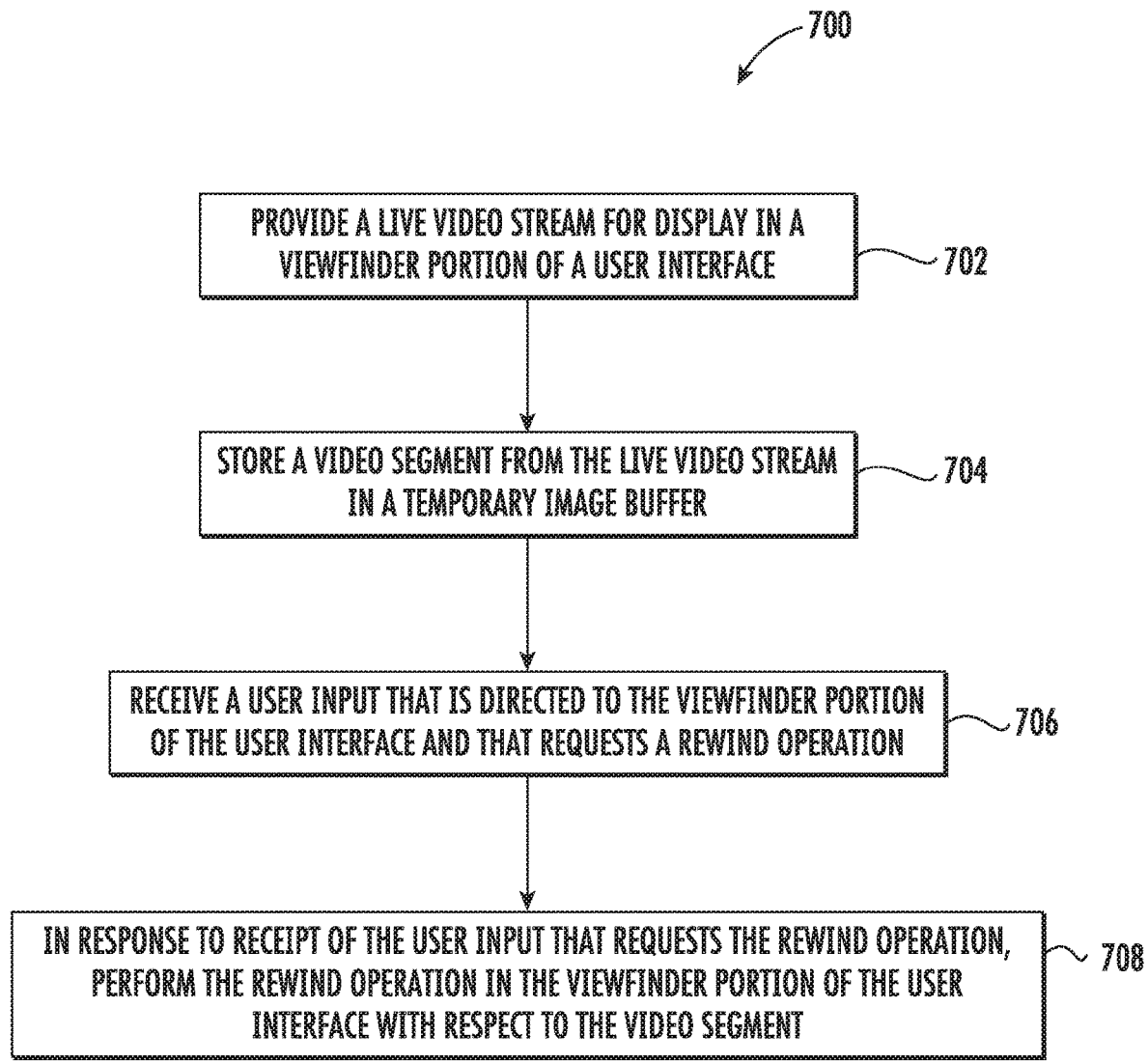
FIG. 7 depicts a flow chart diagram of an example method for performing a rewind operation according to example embodiments of the present disclosure.

FIG. 7 depicts a flow chart diagram of an example method for performing a rewind operation according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, the method 700 may include providing a live video stream for display in a viewfinder portion of a user interface, for example as described above with reference to frame 552 of FIG. 5C and FIG. 6. The live video stream can depict at least a portion of a current field of view of the image capture system of the mobile image capture device.

At 704, the method 700 may include storing a video segment from the live video stream in a temporary image buffer, for example as described above with reference to FIGS. 1 through 5C. The video segment can include a plurality of image frames captured by the image capture system.

At 706, the method 700 may include receiving a user input that is directed to the viewfinder portion of the user interface and that requests a rewind operation, for example as described above with reference to FIG. 5B and frame 554 of FIG. 5C.

At 708, the method 700 may include performing the rewind operation in the viewfinder portion of the user interface with respect to the video segment in response to receipt of the user input that requests the rewind operation, for example as described above with reference to FIGS. 5A through 6. During the rewind operation, at least two of the image frames of the video segment can be provided for display in the user interface in a reverse chronological order, for example as described above with reference to frame 558 of FIG. 5C and FIG. 6.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A mobile image capture device, comprising:
an image capture system operable to capture image frames;
a touch-sensitive display screen;
one or more processors; and
one or more non-transitory computer-readable media that store instructions that, when executed by the one or more processors, cause the one or more processors to perform operations, the operations comprising:
providing a live video stream for display in a viewfinder portion of a user interface displayed on the touch-sensitive display screen, the live video stream depicting at least a portion of a current field of view of the image capture system of the mobile image capture device;
storing a video segment from the live video stream in a temporary image buffer, wherein the video segment comprises a plurality of image frames captured by the image capture system;
receiving a user input that is directed to the viewfinder portion of the user interface and that requests a rewind operation, wherein the user input comprises a user touch action with respect to the touch-sensitive display screen; and
in response to receipt of the user input that requests the rewind operation, performing the rewind operation in the viewfinder portion of the user interface with respect to the video segment, wherein performing the rewind operation comprises performing a scrubbing operation in response to movement of the user input, and wherein during the rewind operation at least two of the image frames of the video segment are provided for display in the user interface in a reverse chronological order.

2. The mobile image capture device of claim 1, wherein the operations further comprise:
receiving a user selection of one of the image frames; and
storing the selected image frame into a non-temporary memory location.

3. The mobile image capture device of claim 1, wherein:
the user input has a speed; and
performing the rewind operation comprises transitioning the user interface between display of a first image frame of the video segment to display of at least a second image frame of the video segment at a speed that is positively correlated to the speed of the user input.

4. The mobile image capture device of claim 1, wherein the video segment from the live video stream is stored in the temporary image buffer in a first-in-first-out (FIFO) configuration associated with a moving time window.

5. The mobile image capture device of claim 1, wherein the operations comprise displaying a rewind strip during the rewind operation.

6. The mobile image capture device of claim 1, wherein the live video stream comprises a composite environmental stream generated from a plurality of live video streams.

7. The mobile image capture device of claim 1, wherein performing the rewind operation comprises providing the video segment for display in the user interface in a reverse chronological order.

8. The mobile image capture device of claim 1, further comprising a machine-learned image selection model configured to receive the plurality of image frames of the video segment, and, in response to receipt of the plurality of image frames, output a frame selection set that describes a selection of at least one of the plurality of image frames, and wherein the operations further comprise:
inputting the plurality of image frames of the video segment into the machine-learned image selection model;
receiving, as an output of the machine-learned image selection model, the frame selection set; and
providing a selection suggestion for display in the user interface, the selection suggestion including at least one of the image frames described by the frame selection set.

9. The mobile image capture device of claim 1, wherein the operations further comprise:

receiving a user input that requests the live video stream switch from a first source to a second source; and in response to receipt of the user input that requests the live video stream to switch from the first source to the second source, switching the live video stream from the first source to the second source.

10. The mobile image capture device of claim 1, wherein the video segment is automatically stored from the live video stream in the temporary image buffer as soon as a camera application is opened.

11. The mobile image capture device of claim 10, the camera application is operable in at least an image capture mode and a video capture mode, and wherein video segment is automatically stored from the live video stream when the camera application is in the image capture mode or the video capture mode.

12. A mobile image capture device, comprising:

an image capture system operable to capture image frames from a plurality of sources, each source having a respective field of view;

one or more processors; and one or more non-transitory computer-readable media that store instructions that, when executed by the one or more processors, cause the one or more processors to perform operations, the operations comprising:

providing a live video stream for display in a viewfinder portion of a user interface, the live video stream comprising a composite environmental stream generated from the plurality of sources;

storing a video segment from the live video stream in a temporary image buffer, wherein the video segment comprises a plurality of image frames captured by the image capture system;

receiving a user input that is directed to the viewfinder portion of the user interface and that requests a rewind operation; and in response to receipt of the user input that requests the rewind operation, performing a rewind operation in the viewfinder portion of the user interface with respect to the video segment, wherein during the rewind operation at least two of the image frames of the video segment are provided for display in a user interface in a reverse chronological order.

13. The mobile image capture device of claim 12, wherein:

providing the live video stream for display in the viewfinder portion of the user interface comprises displaying a primary live video stream and a secondary live video stream, the primary live video stream displayed larger than the secondary live video stream;

displaying the primary live video stream comprises displaying images from a first source of the plurality of sources; and displaying the secondary live video stream comprises displaying images from a second source of the plurality of sources.

14. The mobile image capture device of claim 12, wherein:

providing the live video stream for display in the viewfinder portion of the user interface comprises displaying a primary live video stream larger than a secondary live video stream; and displaying the primary live video stream comprises automatically switching between displaying images from a first source of the plurality of sources to displaying images from a second source of the plurality of sources.

15. The mobile image capture device of claim 14, wherein the first source of the plurality of sources comprises a front-facing camera, and wherein the second source of the plurality of sources comprises a rearward-facing camera.

16. A mobile image capture device, comprising:

an image capture system operable to capture image frames;

one or more processors; and one or more non-transitory computer-readable media that store instructions that, when executed by the one or more processors, cause the one or more processors to perform operations, the operations comprising:

providing a live video stream for display in a viewfinder portion of a user interface, the live video stream depicting at least a portion of a current field of view of the image capture system of the mobile image capture device;

storing a video segment from the live video stream in a temporary image buffer, wherein the video segment comprises a plurality of image frames captured by the image capture system;

receiving a user input that is directed to the viewfinder portion of the user interface and that requests a rewind operation;

in response to receipt of the user input that requests the rewind operation, performing the rewind operation in the viewfinder portion of the user interface with respect to the video segment, wherein during the rewind operation at least two of the image frames of the video segment are provided for display in the user interface in a reverse chronological order; and displaying a rewind strip during the rewind operation.

17. A mobile image capture device, comprising:

an image capture system operable to capture image frames;

a machine-learned image selection model configured to receive a plurality of image frames of a video segment, and, in response to receipt of the plurality of image frames, output a frame selection set that describes a selection of at least one of the plurality of image frames;

one or more processors; and one or more non-transitory computer-readable media that store instructions that, when executed by the one or more processors, cause the one or more processors to perform operations, the operations comprising:

providing a live video stream for display in a viewfinder portion of a user interface, the live video stream depicting at least a portion of a current field of view of the image capture system of the mobile image capture device;

storing the video segment from the live video stream in a temporary image buffer, wherein the video segment comprises the plurality of image frames captured by the image capture system;

receiving a user input that is directed to the viewfinder portion of the user interface and that requests a rewind operation;

in response to receipt of the user input that requests the rewind operation, performing the rewind operation in the viewfinder portion of the user interface with respect to the video segment, wherein during the rewind operation at least two of the image frames of the video segment are provided for display in the user interface in a reverse chronological order;

inputting the plurality of image frames of the video segment into the machine-learned image selection model;
receiving, as an output of the machine-learned image selection model, the frame selection set; and
providing a selection suggestion for display in the user interface, the selection suggestion including at least one of the image frames described by the frame selection set.

\* \* \* \* \*